United States Patent
Kawasaki

(10) Patent No.: US 8,526,997 B2
(45) Date of Patent: Sep. 3, 2013

(54) FREQUENCY CONTROL DEVICE, FREQUENCY CONTROL METHOD, AND BASE TRANSCEIVER STATION

(75) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 365 days.

(21) Appl. No.: 12/728,418

(22) Filed: Mar. 22, 2010

(65) Prior Publication Data
US 2010/0248743 A1    Sep. 30, 2010

(30) Foreign Application Priority Data
Mar. 24, 2009  (JP) .................................. 2009-71948

(51) Int. Cl.
*H04M 1/00*    (2006.01)

(52) U.S. Cl.
USPC ............ 455/550.1; 455/703; 455/71; 455/75; 455/113; 455/136; 455/164.1; 455/173.1; 455/182.2; 455/192.2

(58) Field of Classification Search
USPC ................... 455/703, 71, 75, 113, 136, 164.1, 455/173.1, 182.1, 182.2, 192.1, 192.2, 550.1
See application file for complete search history.

(56) References Cited

U.S. PATENT DOCUMENTS

| | | | |
|---|---|---|---|
| 5,666,655 A * | 9/1997 | Ishikawa et al. | 455/512 |
| 5,884,178 A | 3/1999 | Ericsson et al. | |
| 6,567,480 B1 * | 5/2003 | Brardjanian et al. | 375/331 |
| 7,149,266 B1 * | 12/2006 | Imamura et al. | 375/355 |
| 8,249,616 B2 * | 8/2012 | Boejer et al. | 455/456.1 |
| 2003/0058966 A1 * | 3/2003 | Gilbert et al. | 375/326 |
| 2004/0013169 A1 * | 1/2004 | Kanemoto et al. | 375/147 |
| 2004/0058678 A1 * | 3/2004 | deTorbal | 455/437 |
| 2004/0203395 A1 * | 10/2004 | Chizhik et al. | 455/63.1 |
| 2005/0287963 A1 * | 12/2005 | Ikeda | 455/115.1 |
| 2006/0039318 A1 * | 2/2006 | Oh et al. | 370/328 |
| 2006/0039491 A1 * | 2/2006 | Han | 375/260 |
| 2006/0223559 A1 * | 10/2006 | Chen et al. | 455/504 |
| 2007/0047671 A1 * | 3/2007 | Chen | 375/326 |
| 2007/0197165 A1 | 8/2007 | Klotsche et al. | |

(Continued)

FOREIGN PATENT DOCUMENTS

| | | |
|---|---|---|
| EP | 0 578 156 | 1/1994 |
| EP | 0 718 986 | 6/1996 |

(Continued)

OTHER PUBLICATIONS

European Search Report dated Jul. 23, 2010, from the corresponding European Application.

*Primary Examiner* — Lester Kincaid
*Assistant Examiner* — Mehmood B Khan
(74) *Attorney, Agent, or Firm* — Katten Muchin Rosenman LLP

(57) ABSTRACT

A frequency control device receiving a signal transmitted from each of a plurality of mobile stations, the frequency control device includes a first detecting unit to detect a frequency deviation generated from the signal, a second detecting unit to acquire information about at least a current position or movement of each of the mobile stations as classification information, and a classifying unit to classify mobile stations estimated to be moving in a same moving direction with a same moving speed as a first mobile station based on the classification information. The frequency control device includes a first calculating unit to calculate a first frequency deviations of a signal received from the first mobile station, and a compensation unit to compensate the frequency deviation of the signal received from the first mobile station based on the first frequency deviation.

10 Claims, 11 Drawing Sheets

(56) References Cited

U.S. PATENT DOCUMENTS

| | | | |
|---|---|---|---|
| 2007/0268976 A1* | 11/2007 | Brink et al. | 375/260 |
| 2007/0281655 A1* | 12/2007 | Ishikawa et al. | 455/296 |
| 2008/0268907 A1* | 10/2008 | Senarath et al. | 455/561 |
| 2009/0098888 A1* | 4/2009 | Yoon | 455/456.2 |
| 2009/0232257 A1* | 9/2009 | Bury | 375/341 |
| 2011/0117942 A1* | 5/2011 | Kazmi et al. | 455/507 |

FOREIGN PATENT DOCUMENTS

| | | |
|---|---|---|
| EP | 1 876 726 | 1/2008 |
| GB | 2 393 594 | 3/2004 |
| JP | 2001-504670 | 4/2001 |

\* cited by examiner

FIG. 4

| GROUP IDENTIFICATION NUMBER | MOBILE STATION IDENTIFICATION NUMBER |
|---|---|
| 1 | 2,3,5 |
| 2 | 1,4 |
| ... | ... |

FREQUENCY CONTROL DEVICE, FREQUENCY CONTROL METHOD, AND BASE TRANSCEIVER STATION

CROSS-REFERENCE TO RELATED APPLICATIONS

This application is based upon and claims the benefit of priority of the prior Japanese Patent Application No. 2009-71948, filed on Mar. 24, 2009, the entire contents of which are incorporated herein by reference.

FIELD

The present invention relates to a frequency control device, a frequency control method, and a base transceiver station that are provided to control the frequency of a radio signal transmitted from a mobile station.

BACKGROUND

In recent years, cellular mobile radio communication systems have been widely available. Therefore, communications are often performed between a mobile station such as a mobile terminal and a base transceiver station when a user boards a moving object such as a train. Further, the speed of moving objects has been increased with advances in transportation. Here, when a mobile station included in the mobile radio communication system moves with a high speed, the reception frequency of a radio signal transmitted from the mobile station to a base transceiver station is changed due to the Doppler effect. For example, in the case where the mobile station approaches the base transceiver station with a high speed, the frequency of a radio signal transmitted from the mobile station to the base transceiver station becomes higher than what is usually obtained. On the other hand, when the mobile station moves away from the base transceiver station with a high speed, the frequency of a radio signal transmitted from the mobile station to the base transceiver station becomes lower than what is usually obtained. Therefore, the base transceiver station compensates for a variance of the reception frequency through an automatic frequency control (AFC) circuit.

For example, Japanese national Publication of International patent Application No. 2001-504670 discloses a method of estimating the speed of a mobile station with precision. The above-described speed estimation method allows for calculating a frequency offset value for each reception burst in consideration of the Doppler shift of information, which occurs in the reception burst. The above-described speed estimation method allows for calculating the signal quality value for each burst and estimating the speed of a mobile station based on the average of frequency offset values, that is, signal quality values achieving at least a specified signal quality level of the calculated signal quality values.

A base transceiver station may measure a frequency deviation with high precision, where the frequency deviation is the difference between the frequency of a radio signal transmitted from a mobile station and a communication frequency that had already been set. Therefore, the base transceiver station determines a compensation value by averaging the frequency deviations of radio signals transmitted from a single mobile station within a specified measurement period. The time period during which the frequency deviations of the radio signals are measured may be long so as to measure the frequency deviations with high precision. On the other hand, when the mobile station is passing by the base transceiver station, the value of the frequency of a radio signal transmitted from the mobile station to the base transceiver station is steeply changed from a high value to a low value. If the frequency deviation of a radio signal is steeply changed as described above when the frequency deviation measurement period is long, it may be difficult for the AFC circuit of the base transceiver station to respond to the variance of the frequency deviation. In that case, it becomes difficult for the base transceiver station to decode a radio signal transmitted from the mobile station with precision so that the radio communication quality is deteriorated.

SUMMARY

According to an aspect of the invention, a frequency control device receiving a signal transmitted from each of a plurality of mobile stations, the frequency control device includes a first detecting unit to detect a frequency deviation generated from the signal, a second detecting unit to acquire information about at least a current position or movement of each of the mobile stations as classification information, and a classifying unit to classify mobile stations estimated to be moving in a same moving direction with a same moving speed as a first mobile station based on the classification information. The frequency control device includes a first calculating unit to calculate a first frequency deviation of a signal received from the first mobile station, and a compensation unit to compensate the frequency deviation of the signal received from the first mobile station based on the first frequency deviation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an exemplary reference table.

DESCRIPTION OF EMBODIMENTS

Hereinafter, a frequency control device 1 according to a first embodiment of the present invention will be described with reference to the attached drawings. When each of users boarding a moving object moving with high speed is performing communications by using a mobile station such as a mobile terminal, the mobile stations move in the same direction with the same speed. The moving speeds of the mobile stations, the moving speeds being relative to a base transceiver station, are equivalent to each other. Consequently, the frequency deviations caused by the Doppler effect of radio signals transmitted from the mobile stations to the base transceiver station are equivalent to each other. Therefore, the above-described frequency control device 1 calculates the statistical representative value of the frequency deviations of the radio signals transmitted from the mobile stations estimated to be moving in the same direction with the same speed. The above-described frequency control device 1 uses the above-described statistical representative value to compensate for the frequency deviations of the radio signals transmitted from those mobile stations so that the period of measuring the frequency deviations used to calculate the value of compensation for the frequency deviations is reduced.

Figure 1:
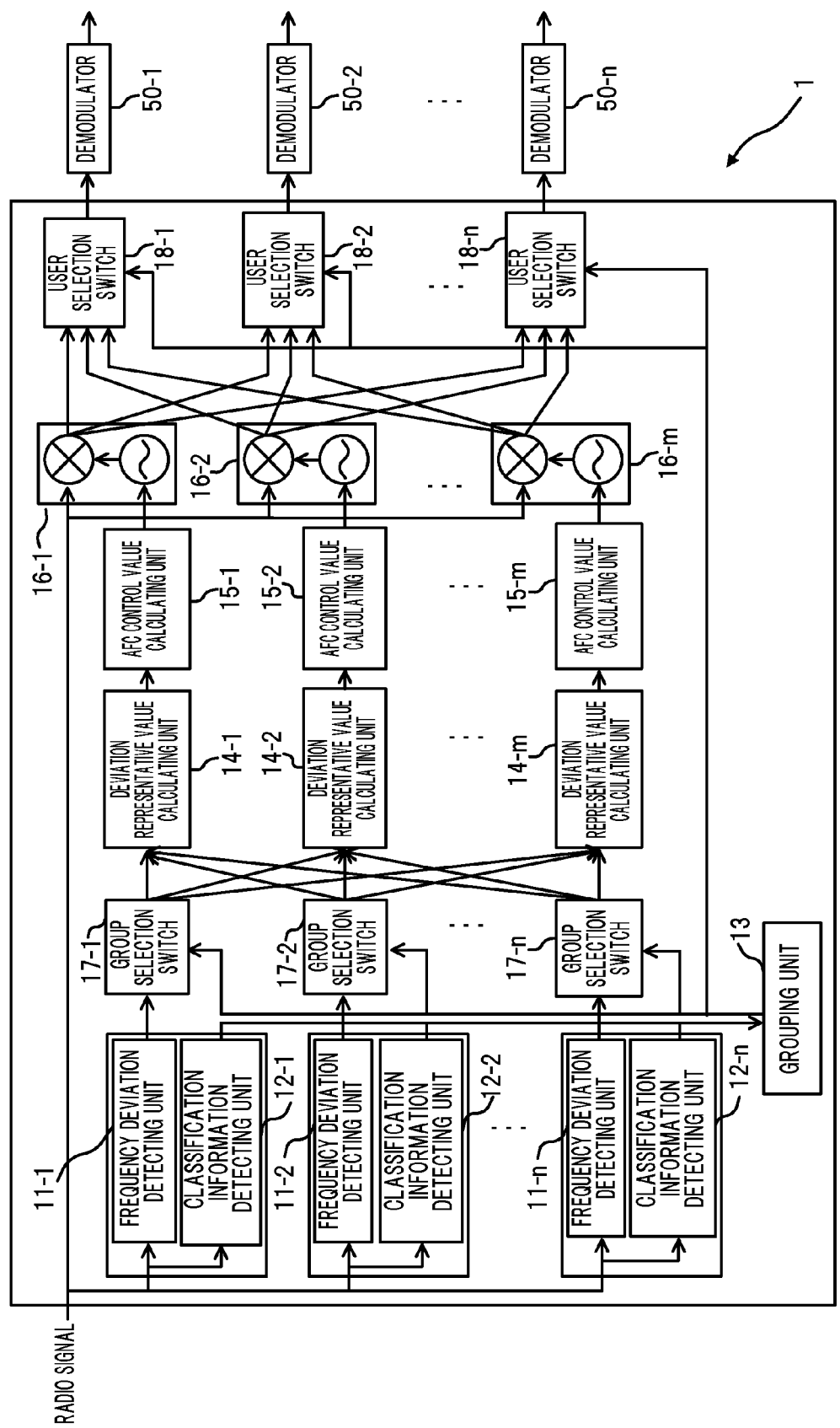
FIG. 1 illustrates the configuration of a frequency control device according to a first embodiment of the present invention.

FIG. 1 illustrates the configuration of the frequency control device 1 integrated into a base transceiver station used to communicate with a mobile station, for example. The frequency control device 1 includes n frequency deviation detecting units 11-$k$ and n classification information detecting units 12-$k$ ($1 \leq k \leq n$), a single grouping part 13, m deviation representative value calculating units 14-$j$, m AFC control value calculating units 15-$j$, and m frequency deviation compensation units 16-$j$ ($1 \leq j \leq m$). The frequency control device 1 includes n group selection switches 17-$k$ and n user selection switches 18-$k$ ($1 \leq k \leq n$). The sign n denotes an integer which is at least two and corresponds to the maximum number of mobile stations transmitting signals that may be received by the base transceiver station at one time. The sign m denotes a natural number equal to the integer n or less, and corresponds to the maximum number of groups for which the frequency control device 1 may perform frequency control at one time.

Each of the above-described units of the frequency control device 1 is formed as a separate circuit. Otherwise, the above-described units may be included in the frequency control device 1 as a single integrated circuit into which the circuits corresponding to the individual units are integrated.

Each of the frequency deviation detecting units 11-1, 11-2, . . . , and 11-$n$ corresponds to a single mobile station performing communications. Each of the frequency deviation detecting units 11-1, 11-2, . . . , and 11-$n$ detects the frequency deviation of a radio signal transmitted from the single mobile station. Since the frequency deviation detecting units 11-1, 11-2, . . . , and 11-$n$ have the same configuration and functions, a single frequency deviation detecting unit 11-$k$ ($1 \leq k \leq n$) will be described below.

The radio signals that are transmitted from the mobile stations are distributed and transmitted to the frequency deviation detecting unit 11-$k$ through a distributor (not shown). The frequency deviation detecting unit 11-$k$ extracts data of a plurality of time slots assigned to the same mobile station from the radio signals. For example, the frequency deviation detecting unit 11-$k$ detects the frequency deviation by detecting a known signal included in the data of the time slots assigned to the same mobile station and determining the rotation amount of the phase of the known signal. For example, Wideband Code Division Multiple Access (W-CDMA) has been used as one of communication systems performed under International Mobile Telecommunication-2000 (IMT-2000) which is the standard of third-generation mobile communication systems. According to the above-described W-CDMA, a pilot signal is provided at the head of each of consecutive time slots of a Dedicated Physical Control Channel (DPCCH). The frequency deviation detecting unit 11-$k$ detects the pilot signal from each of the time slots by executing correlation calculation for the signal waveform corresponding to the pilot signal toward the consecutive time slots used to communicate with the same mobile station. The frequency deviation detecting unit 11-$k$ calculates the phase of each of the pilot signals based on the I component and the Q component of the pilot signal. The frequency deviation detecting unit 11-$k$ calculates the frequency deviation based on the amount of phase rotation achieved between the pilot signals according to the following equation:

$$\Delta\phi = 2\pi f_e T_s.$$

Here, the sign $\Delta\phi$ denotes the amount of phase rotation achieved between the pilot signals of two time slots and the sign $T_s$ denotes the period of each of the time slots in which the two pilot signals are individually included. The sign $f_e$ denotes the frequency deviation. The frequency deviation detecting unit 11-$k$ transmits data of the calculated frequency deviation to the group selection switch 17-$k$ corresponding to the same mobile station as that of the frequency deviation detecting unit 11-$k$.

Each of the classification information detecting unit 12-1, 12-2, . . . , and 12-$n$ corresponds to a single mobile station performing communications. Each of the classification information detecting unit 12-1, 12-2, . . . , and 12-$n$ detects information relating to the position and/or the movement of the mobile station as classification information based on the radio signal transmitted from the mobile station, so as to classify the mobile station under a group with the same moving direction and the same moving speed. Since the classification information detecting units 12-1, 12-2, . . . , and 12-$n$ have the same configuration and functions, a single classification information detecting unit 12-$k$ ($1 \leq k \leq n$) will be described below. Further, the classification information detecting unit 12-$k$ corresponds to the same mobile station as that of the frequency deviation detecting unit 11-$k$. Therefore, the classification information detecting unit 12-$k$ detects the classification information from a time slot assigned to the same mobile station as that from which the frequency deviation detecting unit 11-$k$ detects the frequency deviation.

The classification information detecting unit 12-$k$ calculates, for example, the frequency deviation of a radio signal transmitted from the mobile station and/or the delay time of a radio signal transmitted from the mobile station, as the classification information. When calculating the frequency deviation of the radio signal transmitted from the mobile station as the classification information, the classification information detecting unit 12-$k$ detects the pilot signal from each of the time slots that are used to communicate with the same mobile station, as is the case with the frequency deviation detecting unit 11-$k$. The classification information detecting unit 12-$k$ calculates the frequency deviation based on the amount of phase rotation achieved between the pilot signals. Further, for obtaining the delay time of the radio signal transmitted from the mobile station as the classification information, the classification information detecting unit 12-$k$ also detects the pilot signal from a time slot used to communicate with the mobile station corresponding to the classification information detecting unit 12-k. The classification information detecting unit 12-k calculates the delay time of the radio signal transmitted from the mobile station based on the difference between the time when the pilot signal is detected and a reference time determined through an internal clock of the frequency control device 1. The classification information detecting unit 12-k transmits the obtained classification information to the grouping unit 13.

When the grouping unit 13 classifies the mobile station based only on the frequency deviation of the radio signal transmitted form the mobile station, the classification information calculating unit 12-k and the frequency deviation detecting unit 11-k that correspond to a single mobile station may be integrated into each other.

Figure 2:
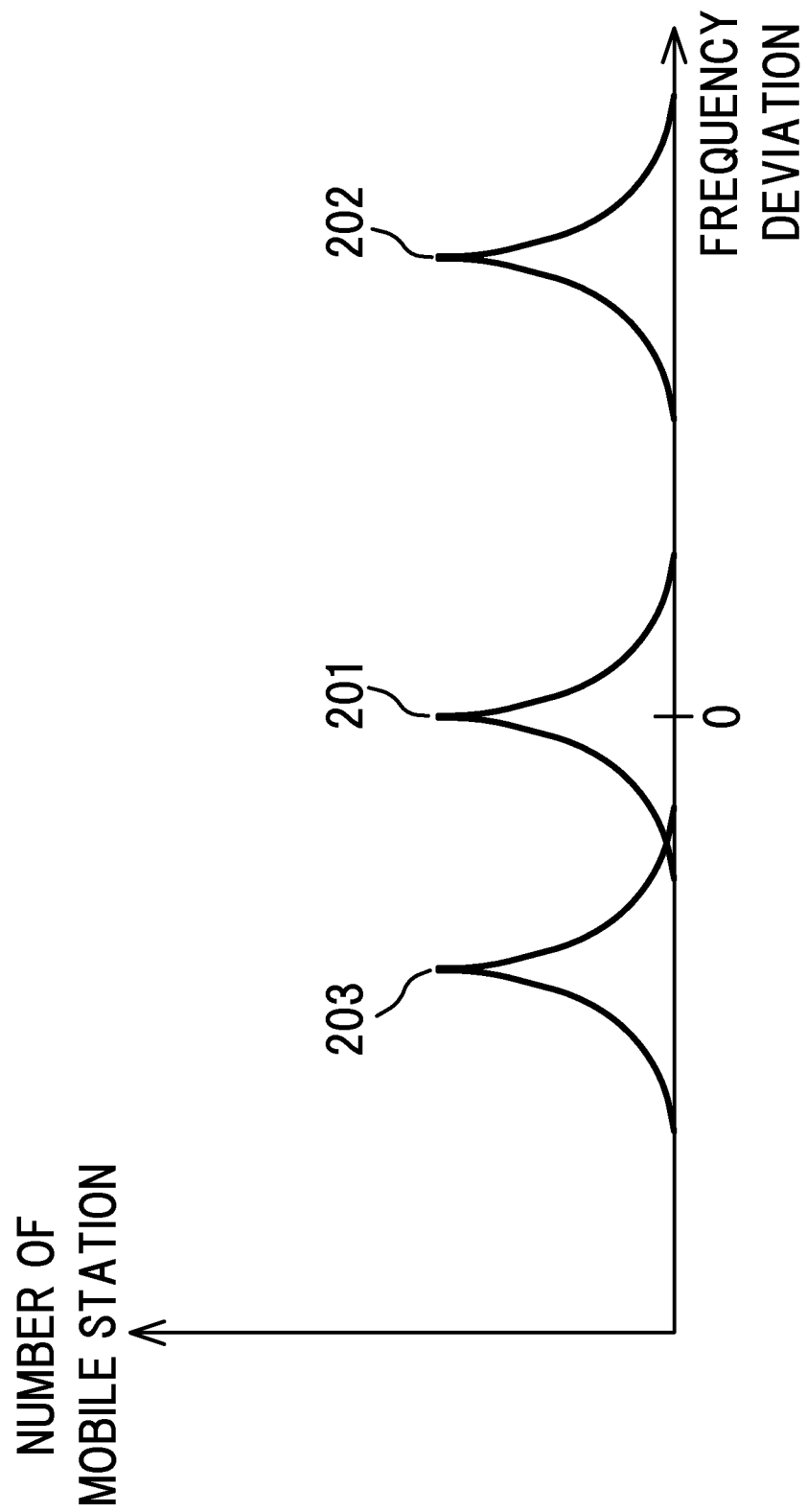
FIG. 2 illustrates an exemplary distribution of the frequency deviations of radio signals transmitted from mobile stations.

The grouping unit 13 groups mobile stations estimated to be moving in the same direction with the same moving speed based on classification information transmitted from each of the classification information detecting units 12-1, 12-2, . . . , and 12-n. FIG. 2 illustrates an exemplary distribution of sample frequency deviations of radio signals transmitted from mobile stations. Each of the sample frequency deviations is the frequency deviation corresponding to a single mobile station, the frequency deviation being transmitted from any single classification information detecting unit 12-k. In FIG. 2, the lateral axis indicates the frequency deviations and the vertical axis indicates the number of mobile stations. As illustrated in FIG. 2, a distribution 201 of the sample frequency deviations of radio signals transmitted from a mobile station used by a user who is at rest and/or moving on foot becomes dense near the numeral 0. On the other hand, a distribution 202 of the sample frequency deviations of radio signals transmitted from a mobile station used by a user boarding a moving object approaching a base transceiver station with high speed is centered on a value higher than the value 0 due to the Doppler effect, the higher value being determined based on the relative speed between the moving object and the base transceiver station. Further, a distribution 203 of the sample frequency deviations of radio signals transmitted from a mobile station used by a user boarding a moving object moving away from the base transceiver station with high speed is centered on a value lower than the value 0 due to the Doppler effect, the lower value being determined based on the relative speed between the moving object and the base transceiver station. When a plurality of users is boarding the same moving object, the speeds of mobile stations used by the users, that is, the speeds relative to the base transceiver station are almost equal to each other. Therefore, when the distributions 202 and 203 are distributions of the frequency deviations of radio signals transmitted from the mobile stations used by the users boarding the same moving object, each of the distributions 202 and 203 is attained in a significantly small area centered on the frequency deviation corresponding to the relative speed.

Here, a frequency deviation caused by the Doppler effect, that is, a Doppler frequency fd is expressed by the following equation:

$$f_d = \frac{f \cdot v}{c}.$$

The sign f denotes the carrier frequency of a communication signal, the sign v denotes a relative speed, and the sign c denotes the speed of light. For example, when a carrier frequency of 2 GHz is obtained and the relative speed between the mobile station and the base transceiver station is 350 km/h, the value of the Doppler frequency fd becomes 648 Hz.

When classifying a mobile station based on the frequency deviation, the grouping unit 13 obtains the peak frequency corresponding to a frequency deviation attained when the number of samples is maximized within an area where the absolute value of the frequency deviation attains at least a specified threshold value. For example, the grouping unit 13 divides a frequency band where the frequency deviation is checked into a plurality of narrow bands and sums the number of sample frequency deviations included in the individual narrow bands. The grouping unit 13 determines the median of the narrow band where the sample number is maximized to be the peak frequency of the frequency deviation distribution. It is preferable that the width of each of the narrow bands may correspond to the measured resolution of the frequency deviation, for example. For example, the width of each of the narrow bands is set to 10 Hz. A threshold value specified to determine an area where a search for the peak frequency is made is set to a minimum value such as 300 Hz for which a variance of transmitted frequency, the variance being caused by the Doppler effect, may be compensated. Here, the grouping unit 13 may search through all of the samples for the peak frequency without setting the above-described threshold value.

After detecting the peak frequency, the grouping unit 13 classifies the moving stations corresponding to a radio signal having a frequency deviation falling within a specified area centered on the detected peak frequency under the same group. For example, the specified area may be three times as large as and/or as small as the standard deviation of frequency deviations distributed centering on the peak frequency. Otherwise, the specified area may be an area centered on the peak frequency, the area extending to a frequency having one-fifth and/or one-tenth of sample frequency deviations corresponding to the peak frequency.

The grouping unit 13 detects the peak frequency, determines the area of frequency deviations belonging to the same group, and classifies the mobile stations corresponding to a frequency deviation which falls within the determined area under the same group, as described above, for each of remaining sample frequency deviations that are not classified under any group. When the sample number corresponding to the peak frequency becomes one or less, the grouping unit 13 classifies the mobile stations corresponding to remaining frequency deviations under individual groups. The grouping unit 13 classifies the mobile stations corresponding to frequency deviations of which absolute values are less than the threshold value under individual groups.

Figure 3:
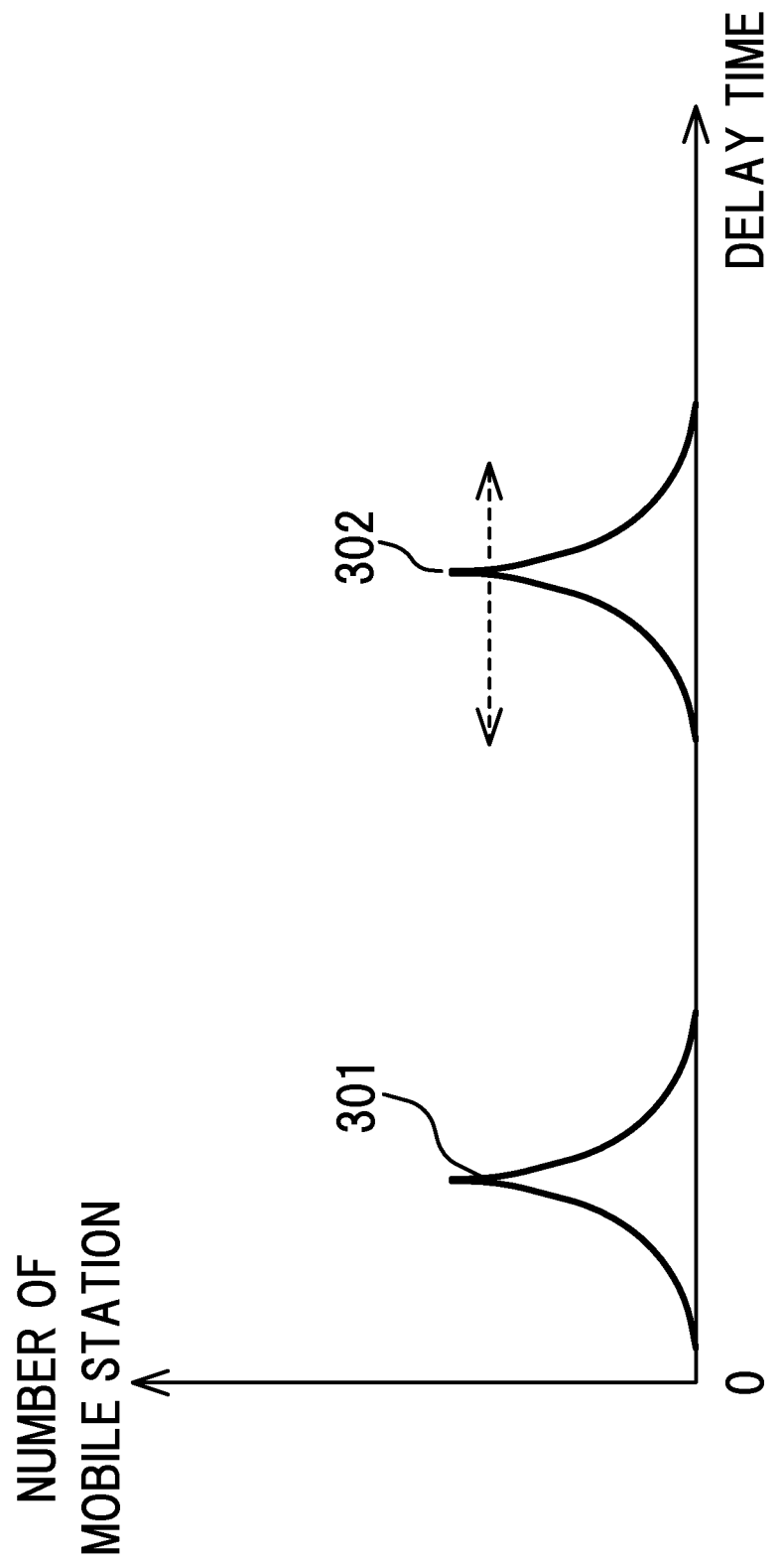
FIG. 3 illustrates an exemplary distribution of the deviation times of radio signals transmitted from mobile stations.

FIG. 3 illustrates an exemplary distribution of sample delay times of radio signals transmitted from mobile stations. Each of the sample delay times denotes the delay time corresponding to a single mobile station, where data of the delay time is transmitted from any single classification information detecting unit 12-k. In FIG. 3, the lateral axis indicates the delay time and the vertical axis indicates the number of mobile stations. As illustrated in FIG. 3, a distribution 301 of sample delay times of radio signals transmitted from a mobile station used by a user near the base transceiver station becomes dense near the numeral 0. The distribution 301 hardly fluctuates. The delay time of a radio signal transmitted from the mobile station is increased with increases in the distance between the base transceiver station and the mobile station. On the other hand, a distribution of sample delay times of radio signals transmitted from a mobile station used by a user distant from the base transceiver station is shown as a distribution 302 centered on a relatively long delay time. Here, the individual delay times of radio signals transmitted from the mobile stations used by the users boarding the moving object approaching the base transceiver station with high speed are decreased with the same speed in response to the speed of the moving object, the speed being relative to the base transceiver station. On the contrary, the individual delay times of radio signals transmitted from mobile stations used by users boarding a moving object moving away from the base transceiver station with high speed are increased with the same speed based on the speed of the moving object, the speed being relative to the base transceiver station.

When classifying a moving station based on the delay time, the grouping unit 13 temporarily stores delay time data obtained by calculating the delay time of a radio signal transmitted from each of the mobile stations a plurality of times at predetermined time intervals in a memory provided in the grouping unit 13, so as to check a change in the delay time. The grouping unit 13 calculates the delay time a specified number of times, where the specified number is at least two, for each of the mobile stations. Then, the grouping unit 13 divides the change amount of the delay time by the difference between the delay time calculation times so that the change speed of the delay time of the radio signal transmitted from each of the mobile stations is obtained. The grouping unit 13 obtains the peak delay time corresponding to the maximum number of sample delay times of sample delay times changing with the same speed. Therefore, for example, the grouping unit 13 divides a time range where the delay time is checked into a plurality of sub ranges and sums the number of sample delay times included in each of the sub ranges. The grouping unit 13 determines the median of a sub range including the maximum number of samples to be the peak of the delay time distribution, that is, the peak delay time. Here, it is preferable that the width of each of the sub ranges may correspond to the measured resolution of the delay time. For example, the width of each of the sub ranges is set to 0.1 μsec. After detecting the peak delay time, the grouping unit 13 classifies the mobile stations corresponding to a radio signal having a delay time falling within a specified area centered on the peak delay time under the same group. For example, the specified area may be three times as large as and/or as small as the standard deviation of sample delay times that are distributed centering on the peak delay time. Otherwise, the specified area may be an area extending to a delay time with one-fifth and/or one-tenth of samples obtained at the peak delay time.

The grouping unit 13 detects the peak delay time, determines the area of delay times belonging to the same group, and classifies the mobile stations corresponding to a delay time which falls within the determined area under the same group, as described above, for each of remaining sample delay times that are not classified under any group. When the sample number corresponding to the peak delay time becomes one or less, the grouping unit 13 classifies the mobile stations corresponding to remaining delay times under individual groups.

The grouping unit 13 may classify a mobile station based on both the frequency deviation and the delay time of a radio signal transmitted from a mobile station. In that case, the grouping unit 13 eventually classifies mobile stations that are further classified under the same group based on the delay time of mobile stations classified under the same group based on the frequency deviation under a single group through the above-described processing, for example. The grouping unit 13 classifies mobile stations that are not classified under the same group based on at least one of the frequency deviation and the delay time under individual groups.

The grouping unit 13 assigns the identification number corresponding to any of the deviation representative value calculating units 14-$j$ ($1 \leq j \leq m$) to each group. The grouping unit 13 generates a reference table showing an identification number indicating a mobile station included in each group in association with the identification number of the group.

FIG. 4 illustrates an exemplary reference table 400. As illustrated in FIG. 4, information about a single group is recorded for each line in the reference table 400. The identification number of a group is recorded in each of the left columns of the reference table 400 and the identification numbers of mobile stations included in the group are recorded in each of the right columns of the reference table 400. For example, the reference table 400 shows that an identification number 1 is assigned to a group 401 shown on the highest line and three mobile stations indicated by identification numbers 2, 3, and 5 are included in the group 401. The reference table 400 further shows that an identification number 2 is assigned to a group 402 shown on the second highest line and two mobile stations indicated by identification numbers 1 and 4 are included in the group 402. The grouping unit 13 transmits data of the reference table 400 to each of the group selection switches 17-$k$ and each of the user selection switches 18-$k$ ($1 \leq k \leq n$).

Each of the group selection switches 17-1, 17-2, . . . , and 17-$n$ transmits data of a frequency deviation, the frequency deviation data being transmitted from the frequency deviation detecting unit 11-$k$, to any of the deviation representative value calculating units 14-$j$ ($1 \leq j \leq m$) based on the reference table data transmitted from the grouping unit 13. Since the group selection switches 17-1, 17-2, . . . , and 17-$n$ have the same configuration and functions, a single group selection switch 17-$k$ ($1 \leq k \leq n$) will be described below. The group selection switch 17-$k$ specifies the identification number of a group associated with the identification number of the mobile station corresponding to the group selection switch 17-$k$ and the frequency deviation detecting unit 11-$k$ with reference to the reference table 400. The group selection switch 17-$k$ transmits the frequency deviation data transmitted from the frequency deviation detecting unit 11-$k$ to the deviation representative value calculating unit 14-$j$ corresponding to the identification number of a specified group. As a result, the frequency deviation data corresponding to mobile stations classified under the same group through the grouping unit 13 is transmitted to each of the deviation representative value calculating units 14-$j$.

For example, on referring to the reference table 400 illustrated in FIG. 4 again, the mobile stations indicated by the identification numbers 2, 3, and 5 are associated with the group 401 indicated by the identification number 1. The group selection switch 17-2 corresponding to the mobile station indicated by the identification number 2 transmits the frequency deviation data transmitted from the frequency deviation detecting unit 11-2 to the deviation representative value calculating unit 14-1 corresponding to the group indicated by the identification number 1. Likewise, the group selection switches 17-3 and 17-5 transmit frequency deviation data items transmitted from the individual frequency deviation detecting units 11-3 and 11-5 to the deviation representative value calculating unit 14-1. On the other hand, the mobile station indicated by the identification number 1 and/or the identification number 4 is associated with the group 402 indicated by the identification number 2. The group selection switches 17-1 and 17-4 transmit frequency deviation data items transmitted from the individual frequency deviation detecting units 11-1 and 11-4 to the deviation representative value calculating unit 14-2.

Each of the deviation representative value calculating units 14-1, 14-2, . . . , and 14-*m* calculates the statistical representative value of the transmitted frequency deviation data items. Since the deviation representative value calculating units 14-1, 14-2, . . . , and 14-*m* have the same configuration and functions, a single deviation representative value calculating units 14-*j* ($1 \leq j \leq m$) will be described below.

For example, the deviation representative value calculating unit 14-*j* calculates the average value of all of the frequency deviations, where data of the frequency deviations is transmitted during a specified period, as the statistical representative value of the frequency deviations. Otherwise, the mode and/or the median of frequency deviations, where data of the frequency deviations is transmitted during a specified period, may be calculated through the deviation representative value calculating unit 14-*j* as the statistical representative value of the frequency deviations.

The deviation representative value calculating unit 14-*j* can calculate the statistical representative value based on the frequency deviations of radio signals transmitted from a plurality of mobile stations. Therefore, a specified period during which the statistical representative value of the frequency deviations is calculated may be shorter than a period during which the statistical representative value of the frequency deviations of radio signals transmitted from a single mobile station is calculated. For example, it is preferable that the specified period may be as long as possible and capable of responding to a variance of the frequency of a radio signal transmitted from a mobile station used by a user boarding a moving object passing by a base transceiver station.

For example, assuming that the moving object travels at a speed of 350 km per hour and the distance between a point where the moving object makes its closest approach to the base transceiver station and the antenna of the base transceiver station becomes 10 meters, a Doppler frequency obtained at a point 10 meters back from the point where the moving object makes its closest approach to the antenna becomes $\sqrt{1/2}$ of a Doppler frequency obtained when the mobile station is sufficiently away from the base transceiver station. Therefore, when a carrier frequency is 2 GHz, a Doppler frequency of 458 Hz is obtained when the moving object reaches the point 10 meters away from the antenna. When the moving object makes its closest approach to the antenna, a Doppler frequency is 0 Hz, and when the moving object passes through the closest approach point and reaches the point 10 meters away from the antenna, a Doppler frequency of −458 Hz is obtained. It takes 206 milliseconds for the moving object to cover a distance of 20 meters centered around the antenna; the value of the Doppler frequency is from +458 Hz to 0 Hz at the first 10 meters and from 0 Hz to −458 Hz at the latter 10 meters. Therefore, the specified period during which the statistical representative value of the frequency deviations is calculated is determined to be, for example, a time period of 20 milliseconds, which is approximately one-tenth of the period during which the steep change occurs, so that the specified period can respond to the steep change in the Doppler frequency.

Further, the deviation representative value calculating unit 14-*j* may reduce the specified period during which the statistical representative value of the frequency deviations is calculated with an increase in the number of the group selection switches 17-*m* provided to transmit the frequency deviation data items to the deviation representative value calculating units 14-*j*. For example, the deviation representative value calculating unit 14-*j* may set the specified period to a value obtained by dividing an initial setting period that had already been set by the number of the group selection switches 17-*m* that are provided to transmit the frequency deviation data items to the deviation representative value calculating unit 14-*j*. It is preferable that the initial setting period may be the shortest period during which a compensation value provided for the frequency deviations of radio signals transmitted from a single mobile station when the Doppler frequency does not fluctuate can be calculated with precision based on the frequency deviations. Namely, the initial setting period is determined to be a time period of 100 milliseconds, for example.

The deviation representative value calculating unit 14-*j* transmits data of the statistical representative value of the frequency deviations to the AFC control value calculating unit 15-*j* corresponding to a group under which the mobile station corresponding to the frequency deviation transmitted to the deviation representative value calculating unit 14-*j* is classified.

Each of the AFC control value calculating units 15-1, 15-2, . . . , and 15-*m* calculates an AFC control value used to compensate for a frequency deviation based on the statistical representative value of frequency deviation data items transmitted from the corresponding deviation representative value calculating unit 14-*j*. Since the AFC control value calculating units 15-1, 15-2, . . . , and 15-*m* have the same configuration and functions, a single AFC control value calculating unit 15-*j* ($1 \leq j \leq m$) will be described below. The AFC control value calculating unit 15-*j* calculates the AFC control value corresponding to the frequency of the statistical representative value of the frequency deviation data items that are transmitted from the deviation representative value calculating unit 14-*j*. When the statistical representative value of the frequency deviations is 10 Hz, for example, the AFC control value calculating unit 15-*j* calculates the value corresponding to 10 Hz as the AFC control value. The AFC control value is used for radio signals transmitted from all of the mobile stations included in the group corresponding to the AFC control value calculating unit 15-*j*. The AFC control value calculating unit 15-*j* transmits data of the AFC control value to the frequency deviation compensation unit 16-*j* corresponding to a group under which the mobile station corresponding to the AFC control value calculating unit 15-*j* is classified.

Each of the frequency deviation compensation units 16-1, 16-2, . . . , and 16-*m* compensates for the frequency deviations of radio signals in groups determined through the grouping unit 13 based on data of the AFC control value, the data being transmitted from the corresponding AFC control value calculating unit 15-*j*. Since the frequency deviation compensation units 16-1, 16-2, . . . , and 16-*m* have the same configuration and functions, a single frequency deviation compensation unit 16-*j* ($1 \leq j \leq m$) will be described below.

The frequency deviation compensation unit 16-*j* includes a voltage control oscillator generating a periodic signal having a frequency attained by increasing and/or decreasing a local oscillation frequency by as much as a frequency indicated by the AFC control value. On the other hand, radio signals transmitted from the mobile stations, where each of the radio signals is distributed through a distributor (not shown), are transmitted to the frequency deviation compensation unit 16-*j*. The frequency deviation compensation unit 16-*j* multiplies the radio signal transmitted from each of the mobile stations by the periodic signal oscillated from the voltage control oscillator. Consequently, the frequency deviation compensation unit 16-*j* compensates for the frequency deviation of the radio signal transmitted from a mobile station included in the group corresponding to the frequency deviation compensation unit 16-*j* so that an intermediate frequency (IF) signal having a specified IF is generated. The frequency deviation compensation unit 16-*j* transmits the generated IF signal to each of the user selection switches 18-1, 18-2, ..., and 18-*n*.

Each of the user selection switches 18-1, 18-2, ..., and 18-*n* selects the IF signal corresponding to a specified mobile station from among IF signals transmitted from the individual frequency deviation compensation units 16-1, 16-2, ..., and 16-*m* based on the reference table data transmitted from the grouping unit 13. Since the user selection switches 18-1, 18-2, ..., and 18-*n* have the same configuration and functions, a single user selection switch 18-*k* ($1 \leq k \leq n$) will be described below. The user selection switch 18-*k* specifies the identification number of a group associated with the identification number of a mobile station demodulated based on the IF signal with reference to the reference table. The user selection switch 18-*k* selects an IF signal transmitted from the frequency deviation compensation unit corresponding to the identification number of a specified group from among the IF signals transmitted from the frequency deviation compensation units 16-1, 16-2, ..., and 16-*m*. The user selection switch 18-*k* transmits the selected IF signal to a demodulator 50-*k* connected to the user selection switch 18-*k*.

For example, on referring to the reference table 400 illustrated in FIG. 4 again, the mobile stations indicated by the identification numbers 2, 3, and 5 are associated with the group 401 indicated by the identification number 1. Then, the user selection switch 18-2 corresponding to the mobile station indicated by the identification number 2 selects an IF signal transmitted from the frequency deviation compensation unit 16-1 corresponding to the group indicated by the identification number 1, and transmits the selected IF signal to the demodulator 50-2 connected to the user selection switch 18-2. Likewise, each of the user selection switches 18-3 and 18-5 selects an IF signal transmitted from the frequency deviation compensation unit 16-1 and transmits the selected IF signal to a demodulator connected to the user selection switches 18-3 and 18-5. On the other hand, the mobile station indicated by the identification number 1 and/or the identification number 4 is associated with the group 402 indicated by the identification number 2. Each of the user selection switches 18-1 and 18-4 selects an IF signal transmitted from the frequency deviation compensation unit 16-2 and transmits the selected IF signal to a demodulator connected to the user selection switches 18-1 and 18-4.

Figure 5:
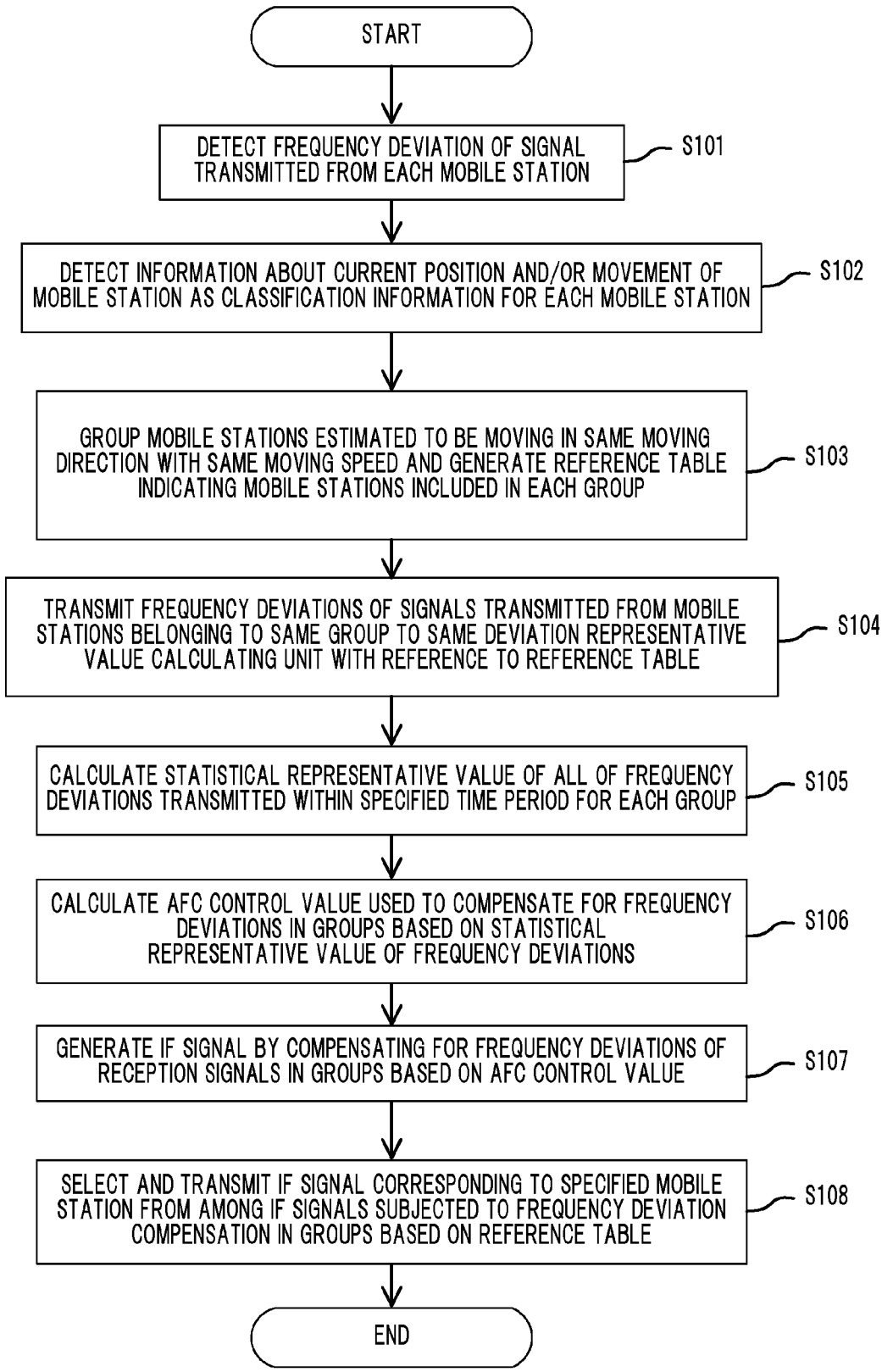
FIG. 5 is an operation flowchart of frequency control processing executed through a frequency control device according to an embodiment of the present invention.

FIG. 5 is an operation flowchart showing frequency control processing executed through the frequency control device 1. As illustrated in FIG. 5, the frequency control device 1 transmits a radio signal transmitted from each of a plurality of mobile stations to the frequency deviation detecting unit 11-*k* and the classification information detecting unit 12-*k* ($1 \leq k \leq n$) that correspond to each of the mobile stations via a distributor (not shown). Each frequency deviation detecting unit 11-*k* detects the frequency deviation of the radio signal transmitted from the mobile station (step S101). The frequency deviation detecting unit 11-*k* transmits data of the obtained frequency deviation to the group selection switch 17-*k* corresponding to the same mobile station as that of the frequency deviation detecting unit 11-*k*. On the other hand, each classification information-detecting unit 12-*k* detects information about the current position and/or the movement of a mobile station from the transmitted radio signal as classification information, so as to group mobile stations estimated to be moving in the same moving direction with the same moving speed (step S102). The classification information detecting unit 12-*k* transmits the obtained classification information to the grouping unit 13.

The grouping unit 13 groups mobile stations estimated to be moving in the same moving direction with the same moving speed based on the classification information transmitted from each classification information detecting unit 12-*k* (step S103). The grouping unit 13 assigns the identification number corresponding to any of the deviation representative calculation units 14-*j* ($1 \leq j \leq m$) to each group. The grouping unit 13 generates a reference table showing the identification number indicating mobile stations included in each group in association with the identification number of the group. The grouping unit 13 transmits data of the reference table to each group selection switch 17-*k* and each user selection switch 18-*k* ($1 \leq k \leq n$).

After that, each group selection switch 17-*k* ($1 \leq k \leq n$) transmits data of the frequency deviations of radio signals transmitted from mobile stations belonging to the same group to the same deviation representative value calculating unit 14-*j* with reference to the reference table (step S104). Therefore, the group selection switch 17-*k* specifies the identification number of a group associated with the identification number of the mobile station corresponding to the group selection switch 17-*k* and the frequency deviation detecting unit 11-*k*. The group selection switch 17-*k* transmits the frequency deviation data transmitted from the frequency deviation detecting unit 11-*k* to the deviation representative value calculating unit 14-*j* ($1 \leq j \leq m$) corresponding to the identification number of a specified group.

Each deviation representative value calculating unit 14-*j* ($1 \leq j \leq m$) calculates the statistical representative value of all of the frequency deviations transmitted during a specified period for each group (step S105). If data of the frequency deviations of radio signals transmitted from the mobile stations had already been transmitted at that time, the statistical representative value of the frequency deviations can be calculated based on all of the frequency deviations. Therefore, a specified period during which the statistical representative value of the frequency deviations is calculated may be shorter than a period during which the statistical representative value of the frequency deviations of radio signals transmitted from a single mobile station is calculated. The deviation representative value calculating unit 14-*j* transmits data of the statistical representative value of the frequency deviations to the AFC control value calculating unit 15-*j* ($1 \leq j \leq m$) corresponding to a group under which the mobile station corresponding to the frequency deviation data transmitted to the deviation representative value calculating unit 14-*j* is classified.

Next, each AFC control value calculating unit 15-*j* ($1 \leq j \leq m$) calculates an AFC control value used to compensate for the frequency deviation in groups based on the statistical representative value of frequency deviation data items transmitted from the corresponding deviation representative value calculating unit 14-*j* (step S106). The AFC control value calculating unit 15-*j* transmits data of the AFC control value to the frequency deviation compensation unit 16-*j* ($1 \leq j \leq m$) corresponding to the same group as that of the AFC control value calculating unit 15-*j*.

Each frequency deviation compensation unit 16-*j* ($1 \leq j \leq m$) compensates for the frequency deviation of a radio signal in groups classified through the grouping unit 13 based on the AFC control value data transmitted from the corresponding AFC control value calculating unit 15-*j* so that an IF signal is generated (step S107). The frequency deviation compensation unit 16-*j* transmits the generated IF signal to each of the user selection switches 18-1, 18-2, ..., and 18-*n*.

Each user selection switch 18-*k* ($1 \leq k \leq n$) selects the IF signal corresponding to a specified mobile station from among IF signals subjected to the frequency deviation compensation in groups based on the reference table data transmitted from the grouping unit 13 (step S108). The user selection switch 18-$k$ transmits the selected IF signal to the demodulator 50-$k$ connected to the user selection switch 18-$k$. Following the above-described operation steps allows the frequency control device 1 to transmit an IF signal obtained by compensating for the frequency deviation of a radio signal transmitted from each of the mobile stations to the demodulator corresponding to each of the mobile stations. The order in which the above-described processing corresponding to step S101 and those corresponding to steps S102 and S103 are performed may be reversed. Otherwise, the frequency control device 1 may perform the processing corresponding to step S101 and those corresponding to steps S102 and S103 in parallel with each other.

As described above, the above-described frequency control device 1 calculates the statistical representative value of the frequency deviations of radio signals transmitted from a plurality of mobile stations estimated to be moving in the same direction with the same speed. The frequency control device uses the statistical representative value to compensate for the frequency deviations of the radio signals transmitted from those mobile stations. Since the frequency control device 1 can acquire many sample frequency deviations within a short time period, the compensation amount of the frequency deviations may be obtained in a short term with precision. Consequently, the frequency control device 1 may compensate for reception frequency deviations transmitted from mobile stations that are used by a plurality of users boarding a moving object which is travelling with a high speed and passing by a base transceiver station.

A frequency control device 2 according to a second embodiment of the present invention will be described. The above-described frequency control device 2 uses the movement information of a mobile station, the movement information being obtained based on a signal that had already been demodulated through a demodulator, as the classification information.

Figure 6:
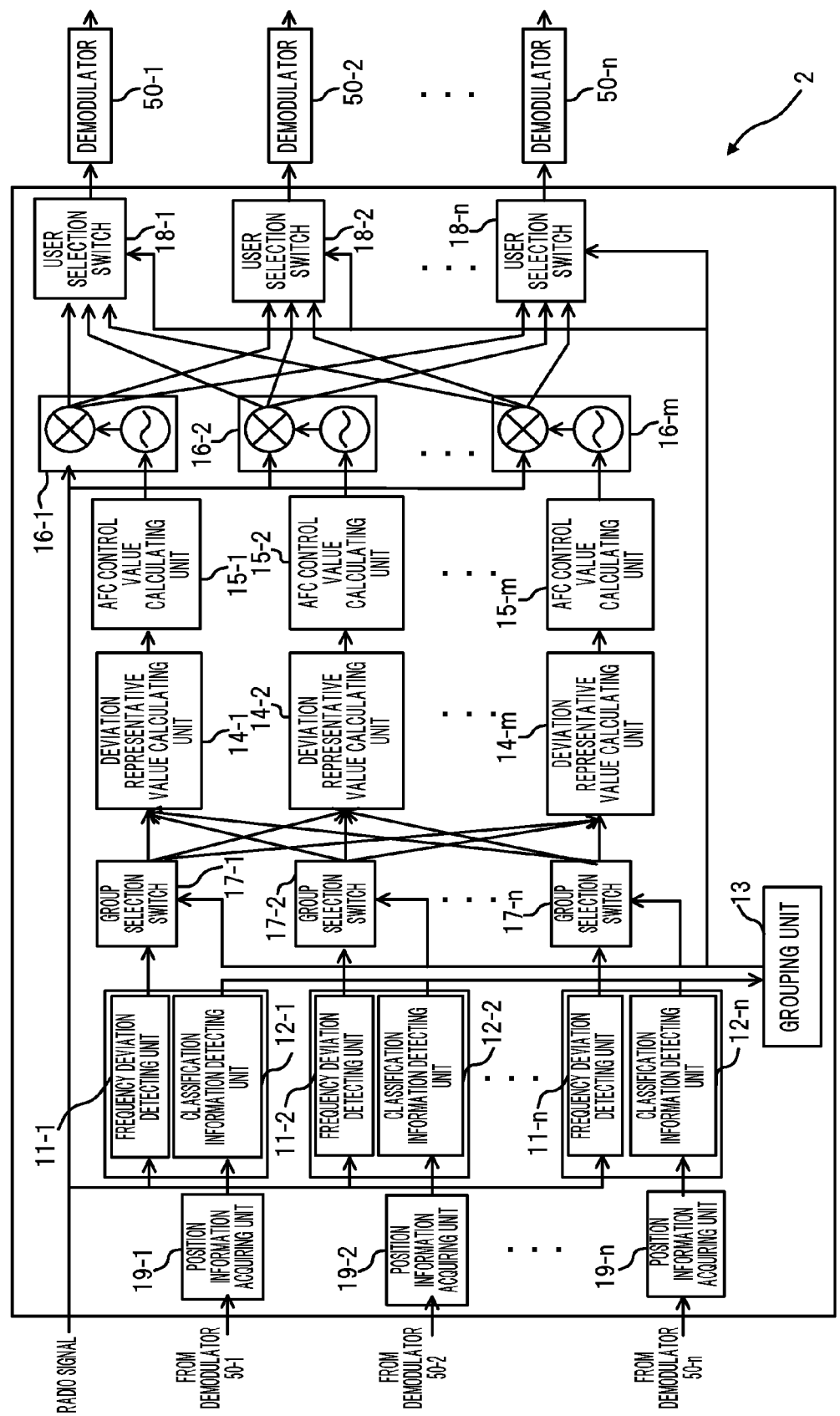
FIG. 6 illustrates the configuration of a frequency control device according to a second embodiment of the present invention.

FIG. 6 illustrates the configuration of the frequency control device 2. As is the case with the frequency device 1 according to the first embodiment, the frequency control device 2 includes the n frequency deviation detecting units 11-$k$, the n classification information detecting units 12-$k$, the n group selection switches 17-$k$, and the n user selection switches 18-$k$ (1≦$k$≦n), the single grouping unit 13, the m deviation representative value calculating units 14-$j$, the m AFC control value calculating units 15-$j$, and the m frequency deviation compensation units 16-$j$ (1≦$j$≦m). Further, the frequency control device 2 includes n position information acquiring units 19-$k$ (1≦$k$≦n). The sign n denotes an integer which is at least two and corresponds to the number of mobile stations transmitting signals that may be received by a base transceiver station at one time. The sign m denotes a natural number equal to the integer n or less, and corresponds to the number of groups for which the frequency control device 2 may perform the frequency control at one time. The components of the frequency control device 2 illustrated in FIG. 6 are designated by the same reference numerals as those of the corresponding components of the frequency control device 1 illustrated in FIG. 1. The frequency control device 2 is different from the frequency control device 1 in that the movement information of a mobile station is used to classify the mobile station. Hereinafter, therefore, the calculation of the classification information used to classify mobile stations and how the mobile stations are grouped will be described. As for the other details of the frequency control device 2, refer to the description of the frequency control device 1 of the above-described first embodiment.

Each of the position information acquiring units 19-1, 19-2, . . . , and 19-$n$ acquires the position information of the corresponding mobile station based on signals obtained by demodulating radio signals transmitted from mobile stations. Since the position information acquiring units 19-1, 19-2, . . . , and 19-$n$ have the same configuration and functions, a single position information acquiring unit 19-$k$ (1≦$k$≦n) will be described below.

When a mobile station provided to communicate with a base transceiver station including the frequency control device 2 includes a global positioning system (GPS) receiver, the mobile station may acquire information about the current position of the mobile station based on information transmitted from a GPS satellite included in the GPS. Otherwise, the mobile station may acquire the current position information of the mobile station by executing positioning under the Advanced Forward Link Trilateration (AFLT) system based on a synchronization signal transmitted from the base transceiver station. The mobile station incorporates the current position information of the mobile station into a radio signal transmitted to the base transceiver station. On the other hand, the position information acquiring unit 19-$k$ acquires a signal obtained by demodulating a radio signal transmitted from the mobile station corresponding to the position information acquiring unit 19-$k$ from the demodulator 50-$k$ (1≦$k$≦n) at regular time intervals. The position information acquiring unit 19-$k$ extracts the current position information of the mobile station from the acquired signal. The position information acquiring unit 19-$k$ transfers the current position information extracted at the regular time intervals to the classification information detecting unit 12-$k$ corresponding to the position information acquiring unit 19-$k$.

The classification information detecting unit 12-$k$ temporarily stores the current position information transmitted from the position information acquiring unit 19-$k$ at the regular time intervals in a memory provided in the classification information detecting unit 12-$k$ to estimate the moving direction and the moving speed of the mobile station. After acquiring information of the current position a specified number of times, the specified number being at least two, the classification information detecting unit 12-$k$ divides the distance between the current positions by the difference between the times when those current positions are acquired, so that movement information expressing the moving direction and the moving speed of the corresponding mobile station is calculated as the classification information. The classification information detecting unit 12-$k$ transmits the movement information to the grouping unit 13.

The grouping unit 13 groups mobile stations considered to be moving in the same moving direction with the same moving speed based on the movement information items of the individual mobile stations, the movement information items being acquired from the classification information detecting units 12-1, 12-2, . . . , and 12-$n$. For example, the grouping unit 13 classifies mobile stations moving with a moving speed falling within a specified speed range along a moving direction falling within a specified direction range under the same group. Here, the specified speed range corresponds to the measured resolution of the moving speed and is set to ±10 km/h, for example. Further, the specified direction range corresponds to the measured resolution of the moving direction and is set to ±5°, for example.

The grouping unit 13 assigns the identification number corresponding to any of the deviation representative value calculating units 14-*j* (1≦j≦m) to each group. The grouping unit 13 generates a reference table showing an identification number indicating a mobile station included in each group in association with the identification number of the group. The grouping unit 13 transmits data of the reference table to each group selection switch 17-*k* and each user selection switch 18*k* (1≦k≦n).

The frequency control device 2 of the second embodiment estimates the moving speed and the moving direction of a mobile station based on information about the current position of the mobile station, the current position being measured through the mobile station itself. For grouping mobile stations moving in the same moving direction with the same moving speed, the above-described frequency control device 2 may use the moving speeds and the moving directions of the mobile stations. Therefore, the frequency control device 2 may classify the mobile stations moving in the same moving direction with the same moving speed under the same group with precision.

A frequency control device 3 according to a third embodiment of the present invention will be described. The above-described frequency control device 3 utilizes the position information of a mobile station, the position information being acquired based on a signal obtained by demodulating a radio signal transmitted from the mobile station and map information as the classification information.

Figure 7:
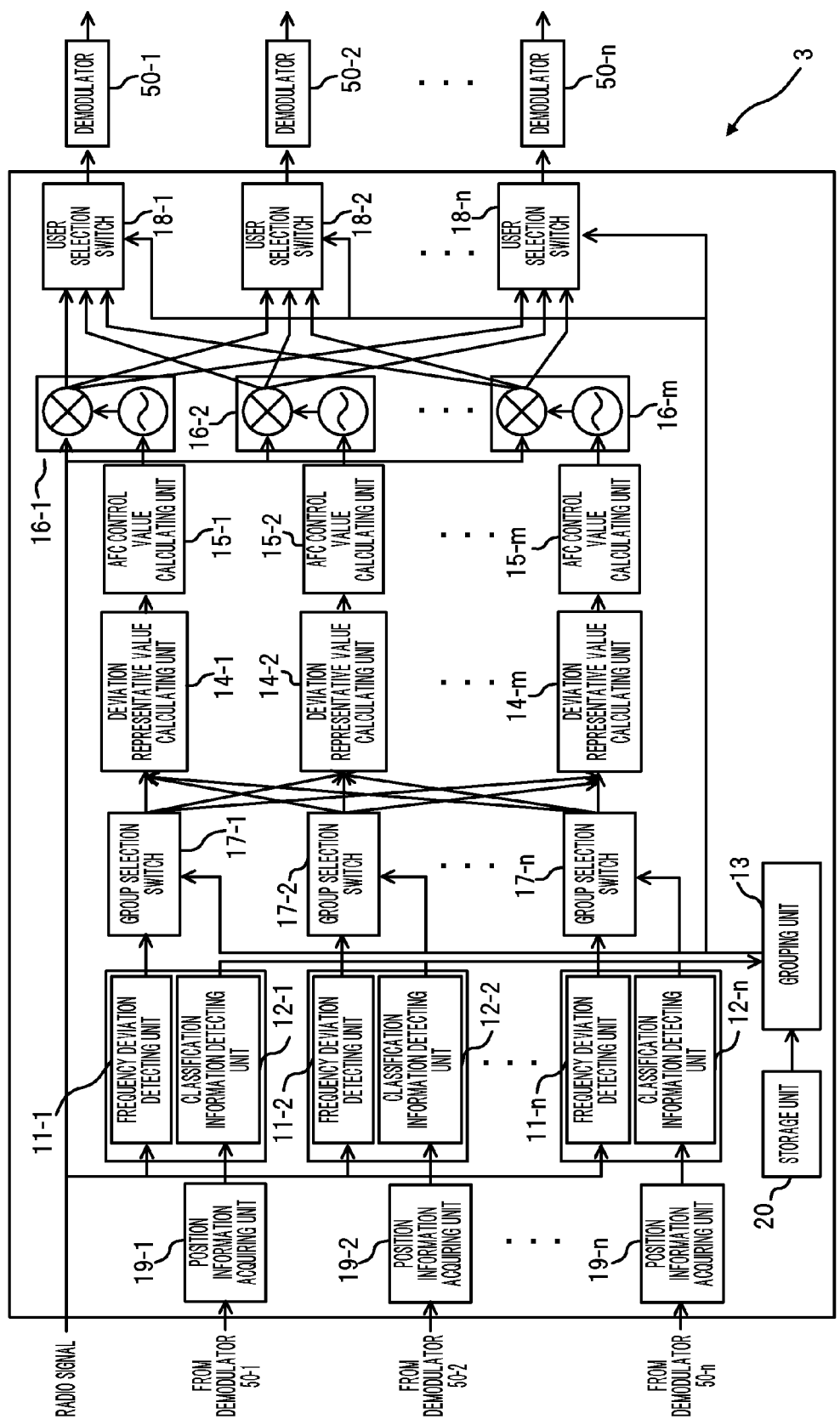
FIG. 7 illustrates the configuration of a frequency control device according to a third embodiment of the present invention.

FIG. 7 illustrates the configuration of the frequency control device 3. As is the case with the frequency device 2 according to the second embodiment, the frequency control device 3 includes the n frequency deviation detecting units 11-*k*, the n classification information detecting units 12-*k*, the n group selection switches 17-*k*, the n user selection switches 18-*k*, and n position information acquiring units 19-*k* (1≦k≦n), the single grouping unit 13, the m deviation representative value calculating units 14-*j*, the m AFC control value calculating units 15-*j*, and the m frequency deviation compensation units 16-*j* (1≦j≦m). Further, the frequency control device 3 includes a storage unit 20 storing the map information. The sign n denotes an integer which is at least two and corresponds to the number of mobile stations transmitting signals that may be received by a base transceiver station at one time. The sign m denotes a natural number equal to the integer n or less, and corresponds to the number of groups for which the frequency control device 3 may perform the frequency control at one time.

The components of the frequency control device 3 illustrated in FIG. 7 are designated by the same reference numerals as those of the corresponding components of the frequency control device 2 illustrated in FIG. 6. The frequency control device 3 is different from the frequency control device 2 in that the current position information of the mobile station and the map information are used to classify a mobile station. Hereinafter, therefore, the calculation of classification information used to classify mobile stations and how the mobile stations are grouped will be described. As for the other details of the frequency control device 3 of the third embodiment, refer to the descriptions of the frequency control device 1 of the first embodiment and the frequency control device 2 of the second embodiment.

The classification information detecting unit 12-*k* transmits the current position information transmitted from the position information acquiring unit 19-*k* to the grouping unit 13 as the classification information. As is the case with the frequency control device 2 of the second embodiment, the classification information detecting unit 12-*k* may calculate the moving direction and the moving speed of a mobile station in addition to the current position information as the classification information, and transmit data of the moving direction and the moving speed to the grouping unit 13.

The storage unit 20 includes a nonvolatile semiconductor memory. The storage unit 20 stores the map information corresponding to a communicable area covered by a base transceiver station including the frequency control device 3. The above-described map information includes information indicating an area including a road and/or a railroad on which a moving object carrying the user of the mobile station travels. For example, the map information indicates a railroad shown on a map expressed by the map information as a set of line segments that may be considered as straight lines, and stores data of the coordinates of the endpoint of each line segment in association with the identification information of the railroad. The storage unit 20 transmits the map information to the grouping unit 13.

The grouping unit 13 groups mobile stations considered to exist in the same moving object based on the current position information of the mobile station, the current position information being acquired from each of the classification information detecting units 12-1, 12-2, ..., and 12-*n*, and the map information acquired from the storage unit 20. For example, the grouping unit 13 classifies mobile stations that are currently positioned on a railroad and that exist in a specified distance range under the same group. Here, a length measured along a direction parallel to the railroad falling within the specified distance range may correspond to the size of a train traveling on the railroad corresponding to the current position of the mobile station. For example, the specified distance range is determined to be 400 meters measured along the direction parallel to the railroad. Further, a length measured along a direction orthogonal to the railroad falling within the specified distance range may correspond to the measured resolution of the current position. For example, the specified distance range is determined to be 20 meters measured centering on the railroad along the direction orthogonal to the railroad. Further, the grouping unit 13 determines whether or not the current position of the mobile station exists on the railroad based on the distance between straight lines indicating the railroad shown by the map information and the current position. The grouping unit 13 calculates the distance between the current position of the mobile station and each of the straight lines indicating the railroad. When the minimum value of the distance is equivalent to the measured resolution of the current position or less, the grouping unit 13 determines that the mobile station is on the railroad. The grouping unit 13 may classify mobile stations that exist within the specified distance range and that move in the same moving direction with the same moving speed under the same group.

The grouping unit 13 assigns the identification number corresponding to any of the deviation representative value calculating units 14-*j* (1≦j≦m) to each group. The grouping unit 13 generates a reference table showing an identification number indicating a mobile station included in each group in association with the identification number of the group. The grouping unit 13 transmits data of the reference table to each group selection switch 17-*k* and each user selection switch 18*k* (1≦k≦n).

The frequency control device 3 of the third embodiment groups mobile stations in consideration of the size of a moving object after determining whether or not the current position of each of the mobile stations, the current position being measured through the mobile station itself, is on a route on which the moving object travels based on the map information. Therefore, the frequency control device 3 may classify mobile stations of a plurality of users boarding the same moving object under the same group with precision. The mobile stations used by the users boarding the same moving object move in the same direction with the same speed. Consequently, the frequency control device 3 may classify the mobile stations moving in the same moving direction with the same moving speed under the same group with precision.

A frequency control device 4 according to a fourth embodiment of the present invention will be described. The above-described frequency control device 4 uses the travel information of a moving object such as a train as the classification information, where the travel information is provided for a mobile station. The travel information is obtained based on a signal obtained by demodulating a radio signal transmitted from the mobile station.

Figure 8:
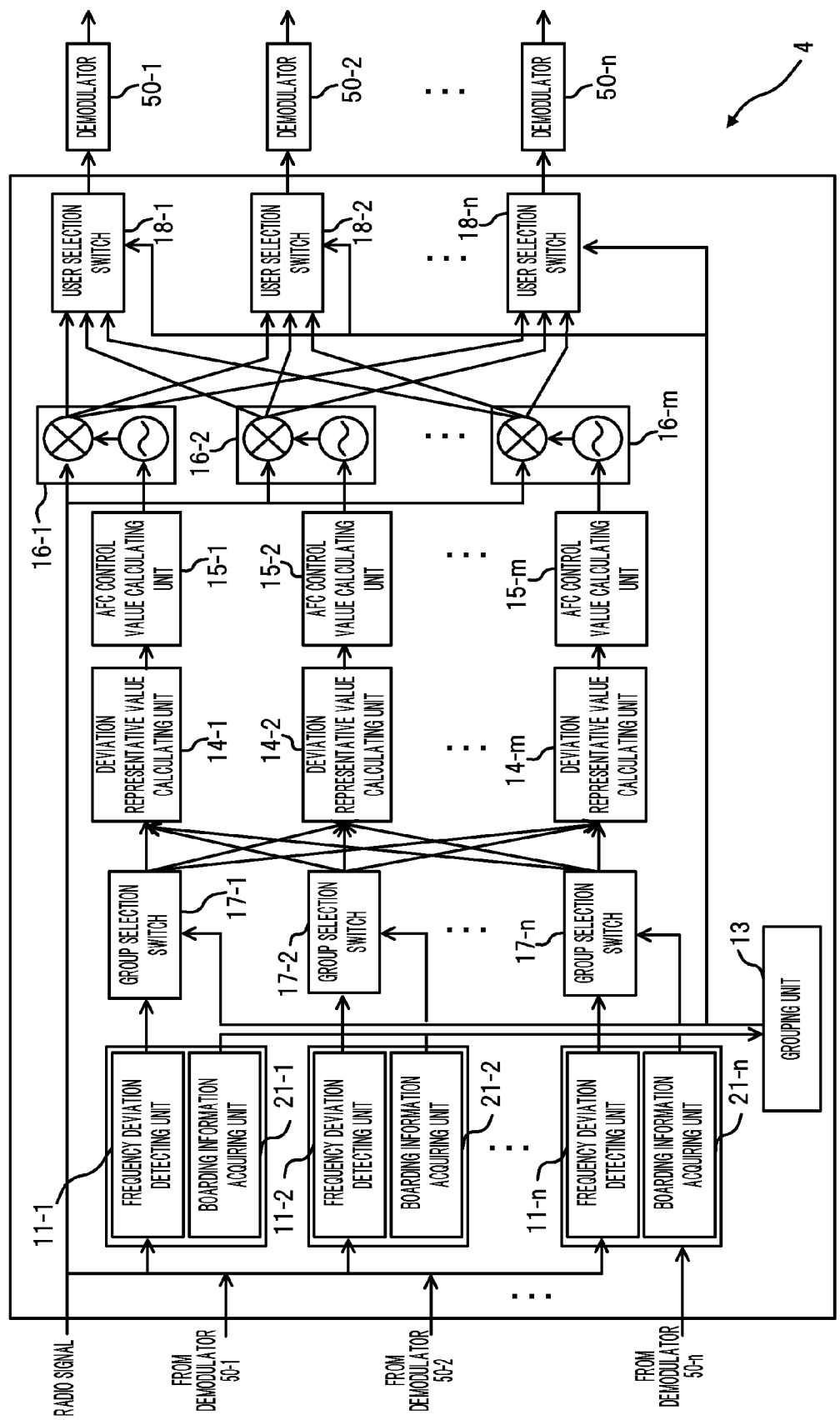
FIG. 8 illustrates the configuration of a frequency control device according to a fourth embodiment of the present invention.

FIG. 8 illustrates the configuration of the frequency control device 4. The frequency control device 4 includes the n frequency deviation detecting units 11-$k$, the n group selection switches 17-$k$, and the n user selection switches 18-$k$ ($1 \leq k \leq n$), the single grouping unit 13, the m deviation representative value calculating units 14-$j$, the m AFC control value calculating units 15-$j$, and the m frequency deviation compensation units 16-$j$ ($1 \leq j \leq m$). Further, the frequency control device 4 includes n boarding information acquiring units 21-$k$ ($1 \leq k \leq n$). The sign n denotes an integer which is at least two and corresponds to the number of mobile stations transmitting signals that may be received by a base transceiver station at one time. The sign m denotes a natural number equal to the integer n or less, and corresponds to the number of groups for which the frequency control may be performed at one time. The components of the frequency control device 4 illustrated in FIG. 8 are designated by the same reference numerals as those of the corresponding components of the frequency control device 1 illustrated in FIG. 1. The frequency control device 4 is different from the frequency control device 1 in that information about a moving object carrying users having mobile stations is used to classify the mobile stations. Hereinafter, therefore, the calculation of the classification information used to classify the mobile stations and how the mobile stations are grouped will be described. As for the other details of the frequency control device 4 of the fourth embodiment, refer to the description of the frequency control device 1 of the above-described first embodiment.

Each of the boarding information acquiring units 21-1, 21-2, . . . , and 21-$n$ functions as a classification information detecting unit. Each of the boarding information acquiring units 21-1, 21-2, . . . , and 21-$n$ acquires information about a moving object carrying a user having the corresponding mobile station based on a signal obtained by demodulating a radio signal transmitted from the mobile station through a demodulator. Since the boarding information acquiring units 21-1, 21-2, . . . , and 21-$n$ have the same configuration and the same functions, a single boarding information acquiring unit 21-$k$ ($1 \leq k \leq n$) will be described below.

For example, when the user buys a railroad ticket through a mobile station, the mobile station may acquire information about a train taken by the user. The train information includes information about the train name, the station where the user takes the train, the station where the user leaves the train, the time when the user takes the train, and the time where the user leaves the train. The mobile station may incorporate information about a moving object such as a train taken by the user having the mobile station into a radio signal transmitted to the base transceiver station. On the other hand, the boarding information acquiring unit 21-$k$ acquires a signal obtained by demodulating a radio signal transmitted from the mobile station corresponding to the boarding information acquiring unit 21-$k$ from the demodulator 50-$k$ ($1 \leq k \leq n$). The boarding information acquiring unit 21-$k$ extracts information about the moving object from the demodulated signal. When the current time falls within a time period of from the time when the user takes the train to the time when the user leaves the train, where information about the time when the user takes the train and the time when the user leaves the train is included in the moving object information, the boarding information acquiring unit 21-$k$ determines that the user of the mobile station is in the moving object. The boarding information acquiring unit 21-$k$ transmits information about the moving object determined to be a moving object carrying the user to the grouping unit 13 as the classification information.

The grouping unit 13 groups mobile stations corresponding to the same moving object name based on the moving object information acquired from each of the boarding information acquiring units 21-1, 21-2, . . . , and 21-$n$. When the travel information of the moving object had already been stored in a memory connected to the grouping unit 13, the grouping unit 13 may refer to the travel information to classify the mobile station with precision. For example, the grouping unit 13 may determine whether or not a moving object indicated by the moving object information acquired from each of the boarding information acquiring units 21-1, 21-2, . . . , and 21-$n$ is traveling through a communication area covered by a base transceiver station including the frequency control device 4 at the present time. If the moving object is travelling through the communication area covered by the base transceiver station, the grouping unit 13 groups mobile stations based on the name of the moving object. On the hand, if the moving object is not travelling through the communication area covered by the base transceiver station, the grouping unit 13 does not use the moving object information to group the mobile stations.

The grouping unit 13 assigns the identification number corresponding to any of the deviation representative value calculating units 14-$j$ ($1 \leq j \leq m$) to each group. The grouping unit 13 generates a reference table showing an identification number indicating a mobile station included in each group in association with the identification number of the group. The grouping unit 13 transmits data of the reference table to each group selection switch 17-$k$ and each user selection switch 18-$k$ ($1 \leq k \leq n$).

The frequency control device 4 of the fourth embodiment groups mobile stations based on information about a moving object carrying a user, the information being stored in each of the mobile stations. Therefore, the frequency control device 4 may classify mobile stations used by users boarding the same moving object under the same group with precision. The mobile stations used by the users boarding the same moving object move in the same direction with the same speed. Consequently, the frequency control device 4 may classify the mobile stations moving in the same moving direction with the same moving speed under the same group with precision.

Figure 9:
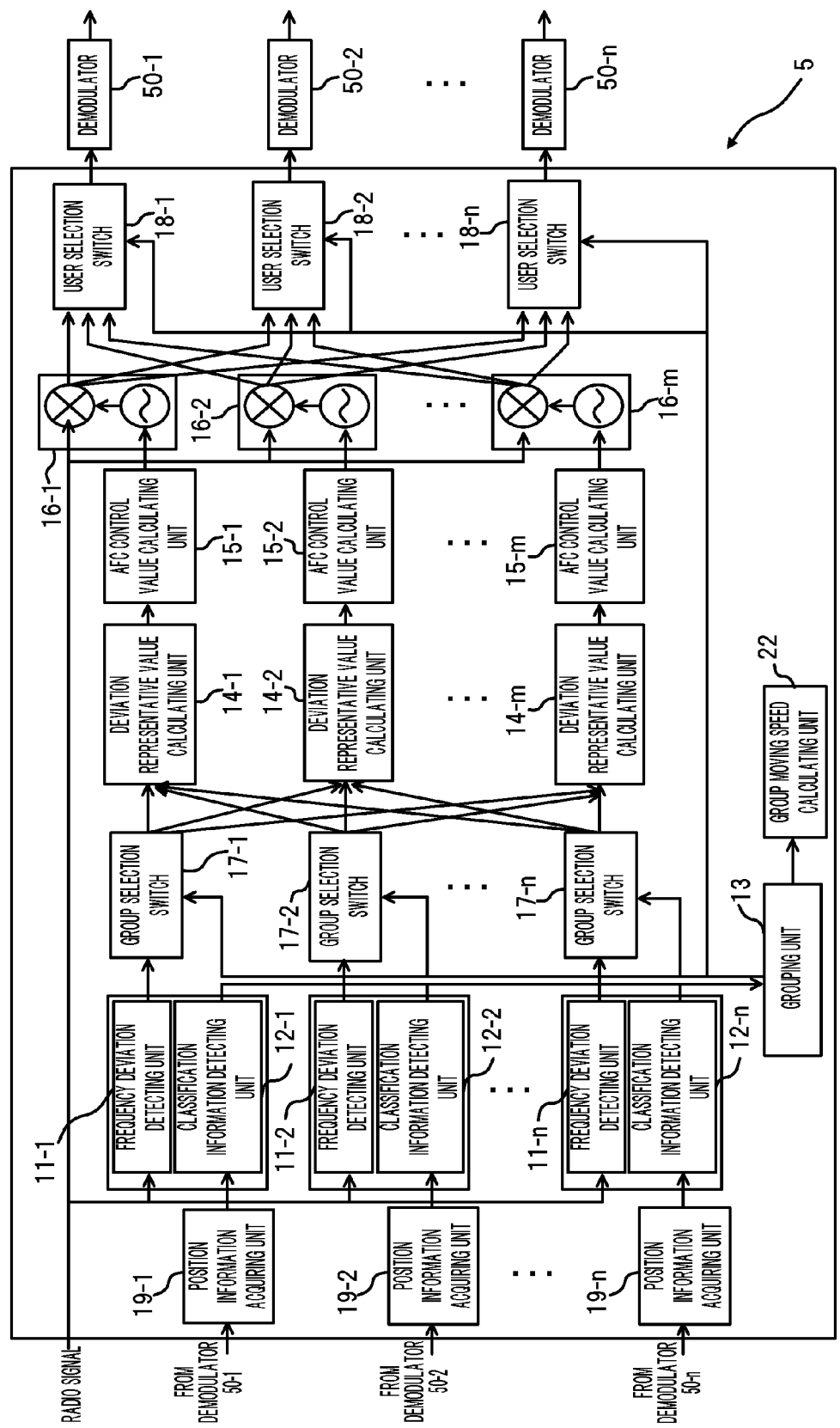
FIG. 9 illustrates the configuration of a frequency control device according to a fifth embodiment of the present invention.

A frequency control device 5 according to a fifth embodiment of the present invention will be described. The above-described frequency control device 5 makes a frequency deviation acquisition period specified to calculate the statistical representative value of frequency deviations variable based on the speeds of mobile stations of each group. FIG. 9 illustrates the configuration of the frequency control device 5. As is the case with the frequency device 2 according to the second embodiment, the frequency control device 5 includes the n frequency deviation detecting units 11-$k$, the n classification information detecting units 12-$k$, the n group selection switches 17-$k$, the n user selection switches 18-$k$, and the position information acquiring units 19-$k$ ($1 \leq k \leq n$), the single grouping unit 13, the m deviation representative value calculating units 14-*j*, the m AFC control value calculating units 15-*j*, and the m frequency deviation compensation units 16-*j* (1≦j≦m). Further, the frequency control device 5 includes a group moving speed calculating unit 22. The sign n denotes an integer which is at least two and corresponds to the number of mobile stations transmitting signals that may be received by the base transceiver station at one time. The sign m denotes a natural number equal to the integer n or less, and corresponds to the number of groups for which the frequency control device 5 may perform the frequency control at one time.

The components of the frequency control device 5 illustrated in FIG. 9 are designated by the same reference numerals as those of the corresponding components of the frequency control device 2 illustrated in FIG. 6. The frequency control device 5 is different from the frequency control device 2 in that the frequency deviation acquisition period determined to calculate the statistical representative value of the frequency deviations is made variable based on the speeds of the mobile stations of each group. Hereinafter, therefore, the determination of the frequency deviation acquisition period and the calculation of the statistical representative value of the frequency deviations will be described. As for the other details of the frequency control device 5 of the fifth embodiment, refer to the descriptions of the frequency control device 1 of the first embodiment and the frequency control device 2 of the second embodiment.

The group moving speed calculating unit 22 acquires data of a reference table showing identification numbers indicating mobile stations included in each group in association with the identification number of the group and data of the moving speed of each of the mobile stations from the grouping unit 13. The group moving speed calculating unit 22 calculates the average moving speed of the mobile stations belonging to each group as the group moving speed. The group moving speed calculating unit 22 may determine the mode and/or the median of the moving speeds of the mobile stations belonging to the group to be the group moving speed in place of the average moving speed. The group moving speed calculating unit 22 informs the deviation representative value calculating unit 14-*j* (1≦j≦m) corresponding to each group of the group moving speed of the group.

The deviation representative value calculating unit 14-*j* determines the frequency deviation acquisition period specified to calculate the statistical representative value of frequency deviations based on the group moving speed. At that time, the deviation representative value calculating unit 14-*j* reduces the frequency deviation acquisition period with an increase in the group moving speed. For example, the deviation representative value calculating unit 14-*j* determines the frequency deviation acquisition period to be approximately one-tenth of a period during which a Doppler frequency is steeply changed so as to respond to a steep change in the Doppler frequency.

For example, assuming that the mobile station travels at a moving speed of 350 km per hour and the distance between a point where the mobile station makes its closest approach to the base transceiver station and the antenna of the base transceiver station becomes 10 meters, as is the case with the above-described frequency control device 1 of the first embodiment, the Doppler frequency is steeply changed from +458 Hz to −458 Hz within a time period of 206 milliseconds taken before the mobile station travels for a distance of twenty meters straddling the point where the mobile station makes its closest approach to the antenna. Therefore, if the group moving speed is 350 km per hour, the deviation representative value calculating unit 14-*j* determines the frequency deviation acquisition period to be a time period of 20 milliseconds. On the other hand, assuming that the mobile station travels at a moving speed of 120 km per hour and the distance between a point where the mobile station makes its closest approach to the base transceiver station and the antenna of the base transceiver station becomes 10 meters, the Doppler frequency is steeply changed from +157 Hz to −157 Hz within a time period of 600 milliseconds taken before the mobile station travels for a distance of twenty meters straddling the point where the mobile station makes its closest approach to the antenna. Therefore, if the group moving speed is 120 km per hour, the deviation representative value calculating unit 14-*j* determines the frequency deviation acquisition period to be a time period of 60 milliseconds.

The deviation representative value calculating unit 14-*j* calculates the average value of all of the frequency deviations, where data of the frequency deviations is transmitted during the frequency deviation acquisition period determined based on the group moving speed, as the statistical representative value of the frequency deviations. Otherwise, the deviation representative value calculating unit 14-*j* may calculate the mode and/or the median of frequency deviations, where data of the frequency deviations is transmitted during the frequency deviation acquisition period, as the statistical representative value of the frequency deviations. The deviation representative value calculating unit 14-*j* transmits data of the statistical representative value of the frequency deviations to the AFC control value calculating unit 15-*j* corresponding to a group under which the mobile station corresponding to frequency deviation data transmitted to the deviation representative value calculating unit 14-*j* is classified.

The above-described frequency control device 5 reduces the frequency deviation acquisition period determined to calculate the statistical representative value of the frequency deviations with an increase in the moving speeds of mobile stations of each group. Therefore, the frequency control device 5 may compensate for the frequency deviation of a radio signal transmitted from a mobile station in response to a variance of the frequency deviation even though the mobile station is moving with a high speed. On the other hand, when the mobile station is moving with a low speed, the frequency control device 5 may calculate the statistical representative value of frequency deviations based on stable sample frequency deviations. Therefore, the frequency control device may compensate for the frequency deviations with appropriate precision.

Figure 10:
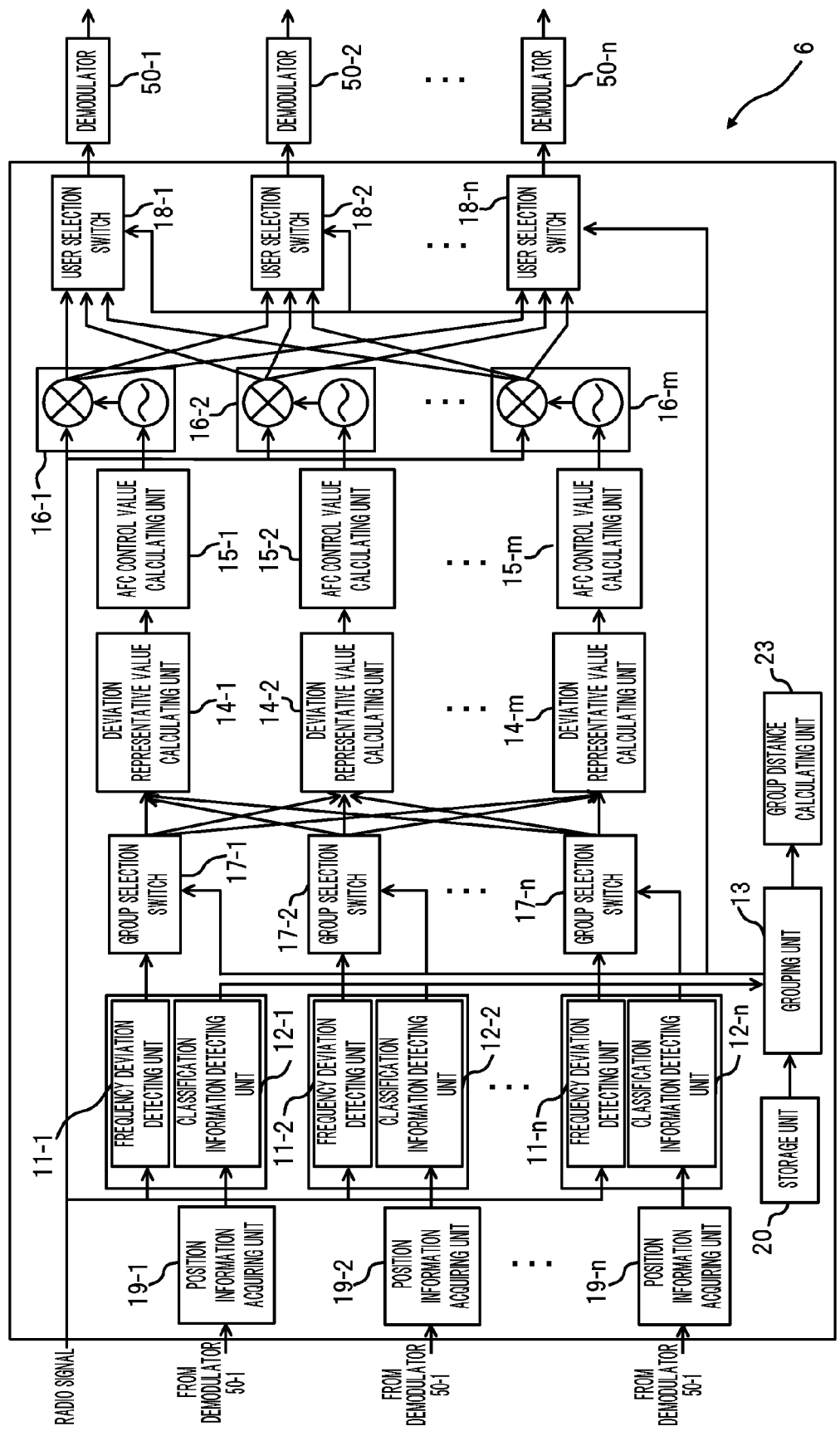
FIG. 10 illustrates the configuration of a frequency control device according to a sixth embodiment of the present invention.

A frequency control device 6 according to a sixth embodiment of the present invention will be described. The above-described frequency control device 6 makes the frequency deviation acquisition period determined to calculate the statistical representative value of frequency deviations variable based on the distance between the positions of mobile stations of each group and a base transceiver station. FIG. 10 illustrates the configuration of the frequency control device 6. As is the case with the frequency device 3 according to the third embodiment, the frequency control device 6 includes the n frequency deviation detecting units 11-*k*, the n classification information detecting units 12-*k*, the n group selection switches 17-*k*, the n user selection switches 18-*k*, and the position information acquiring units 19-*k* (1≦k≦n), the single grouping unit 13 and the storage unit 20, the m deviation representative value calculating units 14-*j*, the m AFC control value calculating units 15-*j*, and the m frequency deviation compensation units 16-*j* (1≦j≦m). Further, the frequency control device 6 includes a group distance calculating unit 23. The sign n denotes an integer which is at least two and corresponds to the number of mobile stations transmitting signals that may be received by a base transceiver station at one time. The sign m denotes a natural number equal to the integer n or less, and corresponds to the number of groups for which the frequency control device 6 may perform the frequency control at one time.

The components of the frequency control device 6 illustrated in FIG. 10 are designated by the same reference numerals as those of the corresponding components of the frequency control device 3 illustrated in FIG. 7. The frequency control device 6 is different from the frequency control device 3 in that the frequency deviation acquisition period determined to calculate the statistical representative value of the frequency deviations is made variable based on the current positions of the mobile stations of each group. Hereinafter, the determination of the frequency deviation acquisition period and the calculation of the statistical representative value of the frequency deviations will be described. As for the other details of the frequency control device 6 of the sixth embodiment, refer to the descriptions of the frequency control device 1 of the first embodiment, the frequency control device 2 of the second embodiment, and the frequency control device 3 of the third embodiment.

The group distance calculating unit 23 acquires data of a reference table showing identification numbers indicating mobile stations included in each group in association with the identification number of the group, the current position information of each of the mobile stations, and the position information of a base transceiver station including the frequency control device 6 from the grouping unit 13. For each group, the group distance calculating unit 23 calculates the barycenter position of each of the mobile stations belonging to the group and the distance between base transceiver stations, where each of the base transceiver stations includes the frequency control device 6, as the group distance. The group distance calculating unit 23 informs the deviation representative value calculating unit 14-$j$ ($1 \leq j \leq m$) corresponding to each group of the group distance of the group.

The deviation representative value calculating unit 14-$j$ determines the frequency deviation acquisition period to calculate the statistical representative value of frequency deviations based on the group distance. At that time, the deviation representative value calculating unit 14-$j$ reduces the frequency deviation acquisition period with a decrease in the group distance. For example, the deviation representative value calculating unit 14-$j$ determines the frequency deviation acquisition period to be approximately one-tenth of a period during which a Doppler frequency is steeply changed so as to respond to a steep change in the Doppler frequency.

For example, assuming that the mobile station travels at a moving speed of 350 km per hour and the distance between a point where the mobile station makes its closest approach to the base transceiver station and the antenna of the base transceiver station becomes 10 meters, as is the case with the above-described frequency control device 1 of the first embodiment, the Doppler frequency is steeply changed from +458 Hz to −458 Hz within a time period of 206 milliseconds taken before the mobile station travels for a distance of twenty meters straddling the point where the mobile station makes its closest approach to the antenna. Therefore, if the group distance is 10 meters or less, the deviation representative value calculating unit 14-$j$ determines the frequency deviation acquisition period to be a time period of 20 milliseconds. On the other hand, if the group distance is larger than 10 meters, the Doppler frequency is not steeply changed. Therefore, the deviation representative value calculating unit 14-$j$ determines the frequency deviation acquisition period to be a time period of 100 milliseconds if the group distance is larger than 10 meters.

The deviation representative value calculating unit 14-$j$ calculates the average value of all of the frequency deviations, where data of the frequency deviations is transmitted during the frequency deviation acquisition period determined based on the group moving speed, as the statistical representative value of the frequency deviations. Otherwise, the deviation representative value calculating unit 14-$j$ may calculate the mode and/or the median of frequency deviations, where data of the frequency deviations is transmitted during the frequency deviation acquisition period, as the statistical representative value of the frequency deviations. The deviation representative value calculating unit 14-$j$ transmits data of the statistical representative value of the frequency deviations to the AFC control value calculating unit 15-$j$ corresponding to a group under which the mobile station corresponding to frequency deviation data transmitted to the deviation representative value calculating unit 14-$j$ is classified.

The frequency control device 6 of the sixth embodiment reduces the frequency deviation acquisition period determined to calculate the statistical representative value of the frequency deviations with a decrease in the distance between the mobile stations of each group and the base transceiver station. Therefore, the frequency control device 6 may compensate for the frequency deviation of a radio signal transmitted from a mobile station in response to a variance of the frequency deviation even though the mobile station is passing by the base transceiver station. On the other hand, the frequency control device 6 may calculate the statistical representative value of the frequency deviations based on stable sample frequency deviations when the mobile station is away from the base transceiver station. Therefore, the frequency control device 6 may compensate for the frequency deviations with appropriate precision.

Each of the above-described units of the frequency control devices of the second to the sixth embodiments is formed as a separate circuit. Otherwise, the above-described units may be included in the frequency control device as a single integrated circuit into which the circuits corresponding to the individual units are integrated.

Further, in each of the above-described embodiments, the frequency control device includes the plurality of frequency deviation detecting units and the plurality of classification information detecting units for the sake of clarity. However, each of those frequency control devices may include a single frequency deviation detecting unit and a single classification information detecting unit, and the frequency deviation detecting unit and the classification information detecting unit may detect the frequency deviation and the classification information of a radio signal transmitted from each of the mobile station individually. Likewise, the frequency control device including a plurality of the position information acquiring units acquiring information about a single mobile station may include a single position information acquiring unit acquiring information about each of a plurality of mobile stations in place of those position information acquiring units. The frequency control device including a plurality of the boarding information acquiring units acquiring information about a single mobile station may include a single boarding information acquiring unit acquiring information about each of a plurality of mobile stations in place of those boarding information acquiring units.

Figure 11:
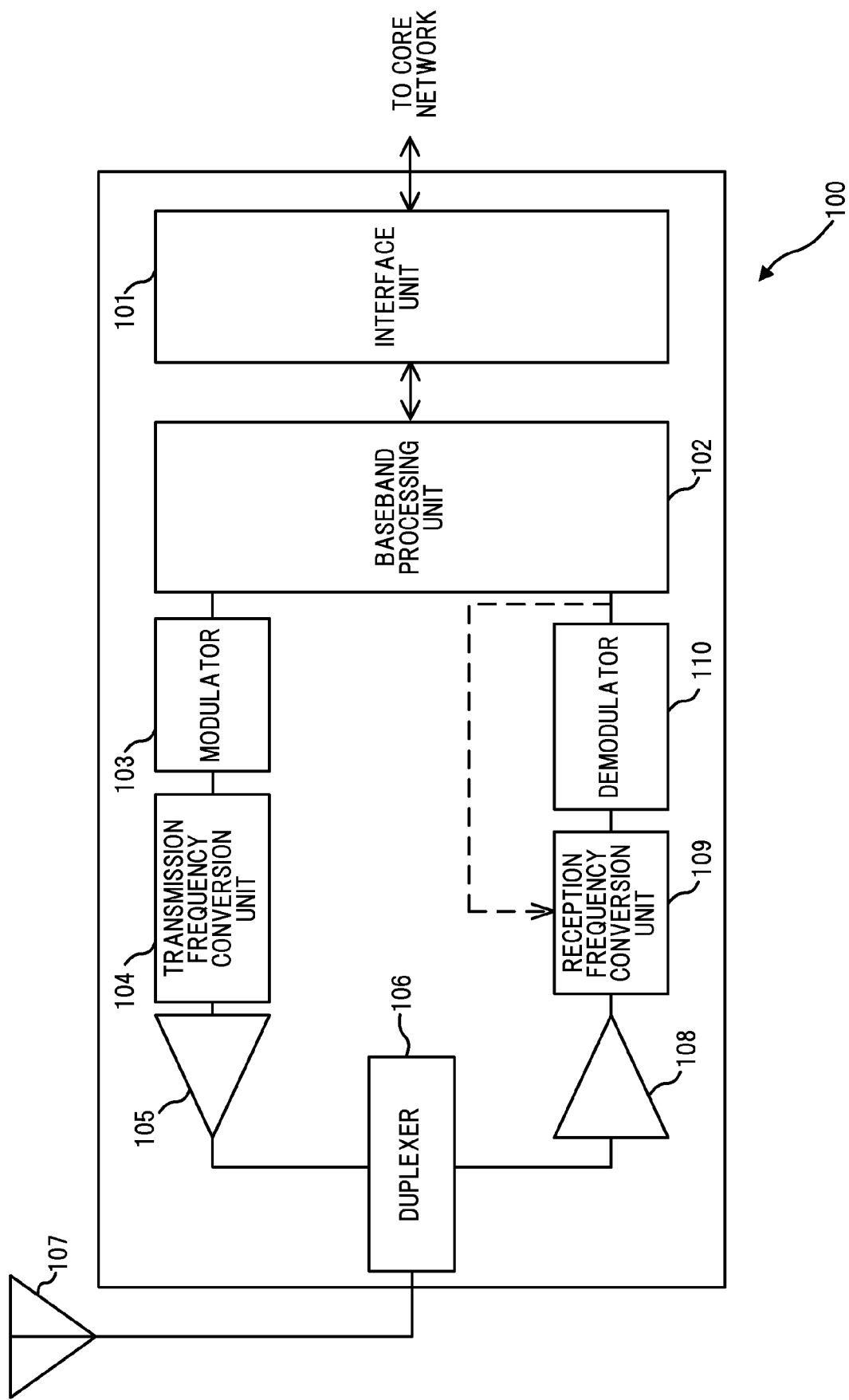
FIG. 11 illustrates the configuration of a base transceiver station device including the frequency control device of any one of the embodiments.

FIG. 11 illustrates the configuration of a base transceiver station device 100 including any one of the frequency control devices of the above-described embodiments. The base transceiver station device 100 includes an interface unit 101, a baseband processing unit 102, a modulator 103, a transmission frequency conversion unit 104, a transmission amplifier 105, a duplexer 106, an antenna 107, a reception amplifier 108, a reception frequency conversion unit 109, and a demodulator 110. Of the above-described units, the reception frequency conversion unit 109 may be any one of the frequency control devices of the above-described embodiments. Further, each of the baseband processing unit 102, the modulator 103, the transmission frequency conversion unit 104, the demodulator 110, and the reception frequency conversion unit 109 may be provided as a separate circuit. Otherwise, the above-described units may be provided as a single integrated circuit into which those circuits are integrated.

The interface unit 101 includes a communication interface provided to connect to a core network. The interface unit 101 receives a downlink signal which shall be transmitted to a mobile station from the core network, and transmits the downlink signal to the baseband processing unit 102. On the other hand, the interface unit 101 receives an uplink signal transmitted from the baseband processing unit 102, where the uplink signal had been transmitted from a mobile station, and transmits the uplink signal to the core network.

The baseband processing unit 102 executes error correction-encoding processing including convolution encoding, turbo encoding, and so forth, and transmission processing including diffusion processing or the like for the downlink signal, and transmits the encoded downlink signal to the modulator 103. The baseband processing unit 102 receives an uplink signal demodulated through the demodulator 110 and executes reception processing including back diffusion processing, error correction-decoding processing, and so forth for the transmitted uplink signal. The baseband processing unit 102 transmits the decoded uplink signal to the interface unit 101.

The modulator 103 performs orthogonal modulation processing including Differential Quadrature Phase Shift Keying (DQPSK) or the like for the encoded downlink signal transmitted from the baseband processing unit 102 so that the downlink signal is multiplexed. The modulator 103 transmits the orthogonally modulated downlink signal to the transmission frequency conversion unit 104. The transmission frequency conversion unit 104 superimposes the orthogonally converted downlink signal on a carrier wave having a radio frequency. The transmission frequency conversion unit 104 transmits the downlink signal superimposed on the carrier wave to the transmission amplifier 105. The transmission amplifier 105 includes a high-power amplifier. The transmission amplifier 105 amplifies the intensity of the downlink signal superimposed on the carrier wave to a desired level, and transmits the downlink signal to the antenna 107 via the duplexer 106. The antenna 107 emits the downlink signal transmitted from the transmission amplifier 105.

Further, the antenna 107 receives the uplink signal transmitted from the mobile station and transmits the uplink signal to the reception amplifier 108 via the duplexer 106. The reception amplifier 108 includes a low-noise amplifier. The reception amplifier 108 amplifies the transmitted uplink signal, and transmits the amplified uplink signal to the reception frequency conversion unit 109.

As is the case with the above-described embodiments, the reception frequency conversion unit 109 compensates for the frequency deviation of the uplink signal and converts the frequency of the uplink signal from a radio frequency to an intermediate frequency. At that time, the reception frequency conversion unit 109 groups a plurality of mobile stations estimated to be moving in the same moving direction with the same moving speed. The reception frequency conversion unit 109 compensates for the frequency deviation of each of uplink signals transmitted from mobile stations belonging to the same group based on a single AFC control value. The reception frequency conversion unit 109 transmits the frequency deviation-compensated uplink signal having the intermediate frequency to the demodulator 110. The demodulator 110 includes a plurality of demodulators and each of the demodulators corresponds to a single mobile station. Each of the demodulators selectively demodulates an uplink signal transmitted from the mobile station corresponding to the modulator from among uplink signals having intermediate frequencies, the uplink signals being transmitted from the reception frequency conversion unit 109. The demodulator 110 transmits the demodulated uplink signal transmitted from each of the mobile stations to the baseband processing unit 102. Further, when any one of the above-described frequency control devices 2 to 6 is used as the reception frequency conversion unit 109, the demodulator 110 transmits the uplink signal transmitted from each of the demodulators to the reception frequency conversion unit 109 as well.

Although the frequency deviation of a radio signal is steeply changed, each of the frequency control devices that are disclosed in this specification may compensate for the frequency deviation transmitted thereto, that is, a reception frequency deviation.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A frequency control device comprising:
    a first detecting circuit to detect each of frequency deviations generated from each of signals transmitted from each of mobile stations respectively;
    a second detecting circuit to acquire classification information about at least one of location, moving speed and moving direction of each of the mobile stations;
    a classifying circuit to classify each of the mobile stations into groups based on the classification information;
    a first calculating circuit to calculate each of representative frequency deviations for each of the groups, respectively, each of the representative frequency deviations being calculated statistically based on the frequency deviations of the mobile stations belonging to each of the groups, respectively; and,
    a compensation circuit to multiply each of the signals by each of compensation signals that are generated based on the representative frequency deviations,
    wherein the second detecting circuit acquires the frequency deviations generated from the signals,
    wherein the classifying circuit detects a peak frequency corresponding to a peak concentration of frequency deviations and classifies each of mobile stations corresponding to a reception signal having a frequency deviation included in a specified range as a first mobile station based on the peak frequency, where the mobile stations are considered to be moving with a same moving speed within the specified range, and wherein when the peak frequency is at least a specified threshold value determined in response to a fact that corresponding mobile stations are moving with at least a specified speed, the classifying circuit classifies each of mobile stations corresponding to a reception signal having a frequency deviation included in the specified range as the first mobile station based on the peak frequency.

2. The frequency control device according to claim 1, wherein the first calculating circuit calculates the representative frequency deviations within a specified time period, and reduces the specified time period with an increase in a number of the mobile stations classified as a first mobile station.

3. The frequency control device according to claim 1, wherein the second detecting circuit acquires a delay time of the signal as the classification information, and
wherein the classifying circuit detects a peak delay time when a peak concentration of delay times which decrease or increase with a same speed is attained from the delay times, and classifies mobile stations corresponding to a reception signal having a delay time included in a specified range as a first mobile station based on the peak delay time.

4. The frequency control device according to claim 1, wherein the second detecting circuit acquires at least two pieces of information on the locations of the mobile stations at specified time intervals, the information being included in signals received from the mobile stations, and acquires each of the moving directions and the moving speeds of the mobile stations, where the moving directions and the moving speeds are calculated based on the pieces of the location information and the time intervals, as the classification information; and
wherein the classifying circuit classifies each of mobile stations having a same moving direction and a same moving speed as a first mobile station based on the moving directions and the moving speeds of the mobile stations.

5. The frequency control device according to claim 4, further comprising a speed calculating circuit configured to calculate a speed of mobile stations classified as the first mobile station based on the moving speeds of the mobile stations, the moving speeds being acquired through the second detecting circuit,
wherein the first calculating circuit calculates the representative frequency deviations within a specified time period, and reduces the specified time period with an increase in the speed.

6. The frequency control device according to claim 1, wherein the second detecting circuit acquires location information of the mobile stations, the location information being included in signals received from the mobile stations, as the classification information, and
wherein the classifying circuit classifies each of mobile stations estimated to be positioned on a same moving object as a first mobile station based on the location information, and map information including information about a position where the frequency control device is provided.

7. The frequency control device according to claim 6, further comprising a distance calculating circuit configured to calculate a distance representing distances between the mobile stations classified as the first mobile station and the frequency control device based on the location information, the location information being acquired through the second detecting circuit, and the map information,
wherein the first calculating circuit calculates the representative frequency deviations within a specified time period, and reduces the specified time period with a decrease in the distance.

8. The frequency control device according to claim 1, wherein the second detecting circuit acquires information about a moving object carrying users using mobile stations of which information is included in signals transmitted from the mobile stations as the classification information, and
wherein the classifying circuit classifies each of mobile stations estimated to be positioned on a same moving object as a first mobile station based on the information about the moving object.

9. A base transceiver station comprising:
an antenna to receive signals transmitted from mobile stations;
an amplifier to amplify the signals received through the antenna;
a frequency conversion circuit to compensate for frequency deviations generated from amplified signals and to convert the amplified signals into signals having second frequencies;
a demodulator to demodulate the signals outputted from the frequency conversion unit; and
a baseband processing circuit to decode data included in the demodulated signals and to output the decoded data to a core network,
wherein the frequency conversion circuit includes:
a first detecting circuit to detect each of frequency deviations generated from each of signals transmitted from each of mobile stations, respectively;
a second detecting circuit to acquire classification information about at least one of location, moving speed and moving direction of each of the mobile stations;
a classifying circuit to classify each of the mobile stations into groups based on the classification information;
a first calculating circuit to calculate each of representative frequency deviations for each of the groups, respectively, each of the representative frequency deviations being calculated statistically based on the frequency deviations of the mobile stations belonging to each of the groups, respectively; and
a compensation circuit to multiply each of the signals by each of compensation signals that are generated based on the representative frequency deviations,
wherein the second detecting circuit acquires the frequency deviations generated from the signals,
wherein the classifying circuit detects a peak frequency corresponding to a peak concentration of frequency deviations and classifies each of mobile stations corresponding to a reception signal having a frequency deviation included in a specified range as a first mobile station based on the peak frequency, where the mobile stations are considered to be moving with a same moving speed within the specified range, and
wherein when the peak frequency is at least a specified threshold value determined in response to a fact that corresponding mobile stations are moving with at least a specified speed, the classifying circuit classifies each of mobile stations corresponding to a reception signal having a frequency deviation included in the specified range as the first mobile station based on the peak frequency.

10. A frequency control method comprising:
detecting each of frequency deviations generated from each of signals transmitted from each of mobile stations respectively;

acquiring classification information about at least one of location, moving speed and moving direction of each of the mobile stations;

classifying each of the mobile stations into groups based on the classification information;

calculating each of representative frequency deviations for each of the groups, respectively, each of the representative frequency deviations being calculated statistically based on the frequency deviations of the mobile stations belonging to each of the groups, respectively; and multiplying each of the signals by each of compensation signals that are generated based on the representative frequency deviations, wherein the acquiring includes acquiring the frequency deviations generated from the signals, wherein the classifying includes detecting a peak frequency corresponding to a peak concentration of frequency deviations and classifying each of mobile stations corresponding to a reception signal having a frequency deviation included in a specified range as a first mobile station based on the peak frequency, where the mobile stations are considered to be moving with a same moving speed within the specified range, and wherein when the peak frequency is at least a specified threshold value determined in response to a fact that corresponding mobile stations are moving with at least a specified speed, the classifying includes classifying each of mobile stations corresponding to a reception signal having a frequency deviation included in the specified range as the first mobile station based on the peak frequency.

* * * * *